(12) United States Patent
Rosenberg

(10) Patent No.: US 7,509,425 B1
(45) Date of Patent: Mar. 24, 2009

(54) ESTABLISHING AND MODIFYING NETWORK SIGNALING PROTOCOLS

(75) Inventor: Jonathan D. Rosenberg, Freehold, NJ (US)

(73) Assignee: Dynamicsoft, Inc., San Jose, CA (US)

( * ) Notice: Subject to any disclaimer, the term of this patent is extended or adjusted under 35 U.S.C. 154(b) by 1416 days.

(21) Appl. No.: 10/342,855

(22) Filed: Jan. 15, 2003

Related U.S. Application Data

(60) Provisional application No. 60/380,016, filed on May 2, 2002, provisional application No. 60/348,587, filed on Jan. 15, 2002.

(51) Int. Cl.
*G06F 15/16* (2006.01)
(52) U.S. Cl. .................................... 709/227; 709/237
(58) Field of Classification Search ......... 709/227–230, 709/237
See application file for complete search history.

(56) References Cited

U.S. PATENT DOCUMENTS

| 7,243,370 | B2 * | 7/2007 | Bobde et al. ............... 726/10 |
| 2003/0014668 | A1 * | 1/2003 | Faccin et al. ............... 713/201 |
| 2004/0028037 | A1 * | 2/2004 | Rasanen et al. ............. 370/354 |

OTHER PUBLICATIONS

F. Andreasen: Session Description Protocol (SDP) Simple Capability Declaration, Network Working Group, Request for Comments 3407, http://www.ietf.org/rfc3407.txt (Oct. 2002).

Baugher, McGrew, et al.: The Secure Real-time Transport Protocol, Internet Engineering Task Force, Internet-Draft, http://www.ietf.org/internet-drafts-ietf-avt-srtp-05.txt (Jun. 2002).

M. Borella, et al.: Realm Specific IP: Framework, Network Working Group, Request for Comments 3102, http://www.ietf.org/rfc/rfc3102.txt (Oct. 2001).

E. Burger: Why Early Media in SIP, Network Work Group, Internet Draft, http://www.ietf.org/internet-drafts/draft-burger-sipping-em-rqt-00.txt (Oct. 12, 2001).

Camarillo, et al.: Integration of Resource Management and Session Initiation Protocol (SIP). Network Working Group, Request for Comments 3312, http://www.ietf.org/rfc/rfc3312.txt (Oct. 2002).

M. Handley: SDP: Session Description Protocol, Network Working Group, Request for Comments 2327, http//www.ietf.org/rfc/rfc2327.txt (Apr. 1998).

(Continued)

*Primary Examiner*—David Lazaro
(74) *Attorney, Agent, or Firm*—Baker Botts L.L.P.

(57) ABSTRACT

Methods among nodes of a computer network for establishing a connection between the server and the client. A client node sends a session-invitation message to a server node. The session-invitation message is in a first protocol that establishes a channel between the client and the server according to parameters of the session-invitation message that specify characteristics of session in a second protocol. The server receives the session-invitation message, sends a provisional response back to the client, and holds in abeyance a success or failure response to the session-invitation, without establishing a channel at the level of the first protocol if no such channel is previously established, and without disrupting a channel at the level of the first protocol if such channel has been previously established.

36 Claims, 14 Drawing Sheets

Network Configuration

OTHER PUBLICATIONS

M. Handley: SIP: Session Initiation Protocol, Network Working Group, Request for Comments 2543, http://www.ietf.org/rfc/rfc2543.txt (Mar. 1999).

Internet Architecture Board (IAB), Floyd, S., et al.: IAB Architectural and Policy Considerations for Open Pluggable Edge Services, Network Working Group, Request for Comments: 3238, http://www.ietf.org/rfc/rfc3238.txt (Jan. 2002).

Kutscher, et al.: Session Description and Capability Negotiation, Network Working Group, Internet-Draft, http://www.ietf.org/internet-draft/draft-ietf-mmusic-sdpng-04.txt (Mar. 1, 2002).

Kutscher, et al.: Session Description and Capability Negotiation, Network Working Group, Internet-Draft, http://www.ietf.org/internet-draft/draft-ietf-mmusic-sdpng-05.txt (Jul. 1, 2002).

W. Marshall, et al.: Integration of Resource Management and SIP, SIP Working Group, Internet Draft, http://www.ietf.org/internet drafts/draft-ietf-sip-manyfolks-resource-03.txt (Nov. 2001).

W. Marshall, et al.: SIP Extensions for Media Authorization, SIP Working Group, Internet-Draft, http://www.ietf.org/internet-drafts/draft-ietf-sip-call-auth-04.txt (Feb. 2002).

W. Marshall, et al.: SIP Extensions for Media Authorization, SIP Working Group, Internet-Draft, http://www.ietf.org/internet-draft/draft-ietf-sip-call-auth-06.txt (May 2002).

C. Perkins: IP encapsulation within IP, Network Working Group, Request for Comment 2003, http://www.ietf.org/rfc/rfc2003.txt (Oct. 1996).

J. Rosenberg: Reliability of Provisional Responses in the Session Initiation Protocol (SIP), Network Working Group, Request for Comments 3262, http://www.ietf.org/rfc/rfc3262.txt (Jun. 2002).

J. Rosenberg, et al.: SIP: Session Initiation Protocol, Network Working Group, Request for Comments 3261, http://www.ietf.org/rfc/rfc3261.txt (Jun. 2002).

J. Rosenberg: The Session Initiation Protocol (SIP) Update Method, Network Working Group, Request for Comments 3311, http://www.ietf.org/rfc/rfc3311.txt (Sep. 2002).

Schulzrinne, et al.: RTP: A Transport Protocol for Real-Time Applications, Network Working Group, Request for Comment 1889, http://www.ietf.org/rfc/rfc1889.txt (Jan. 1996).

Schulzrinne, et al.: The Reason Header Field for the Session Initiation Protocol (SIP), Network Working Group, Request for Comments 3326, http://www.ietf.org/rfc/rfc3326.txt (Dec. 2002).

SIP WG Camarillo, et al.: Integration of Resource Management and SIP, Internet Engineering Task Force, Internet Draft, http://www.ietf.org/internet-drafts/draft-ietf-sip-manyfolks-resource-07.ps (Apr. 8, 2002).

SIP WG, Schulzrinne.: The Reason Header Field for the Session Initiation Protocol, Internet Engineering Task Force, Internet Draft, http://www.ietf.org/internet-drafts/drafts-ietf-sip-reason-00.txt (Apr. 23, 2002).

SIP WG, Rosenberg, Jonathan: The Session Initiation Protocol Update Method, Internet Engineering Task Force, Internet-Draft, http://www.ietf.org/internet-drafts/draft-ietf-sip-update-02.txt (Apr. 30, 2002).

SIP WG, Rosenberg, Jonathan: Reliability of Provisional Responses in SIP, Internet Engineering Task Force, Internet-Draft, http://www.ietf.org/internet-drafts/draft-ietf-sip-100rel-06.txt (Feb. 27, 2002).

SIP WG, Rosenberg, Jonathan: SIP Early Media, Internet Engineering Task Force, Internet-Draft, http://www.jdrosen.net/papers/draft-rosenberg-sip-early-media-00.txt (Jul. 13, 2001).

SIP WG, Rosenberg, Jonathan: SIP Session Initiation Protocol, Internet Engineering Task Force, Internet-Draft, http://www.ietf.org/internet-drafts/draft-ietf-sip-rfc2543bis-09ps (Feb. 27, 2002).

SIP WG, Rosenberg, Jonathan: SIP Session Initiation Protocol, Internet Engineering Task Force, Internet-Draft, http://www.ietf.org/internet-drafts/draft-ietf-sip-rfc2543bis-05txt (Apr. 2002).

SIP WG, Sen, Sanjoy: Early Media Issues and Scenarios, Internet engineering Task Force, Internet Draft, http://www.ietf.org/internet-drafts/draft-sen-sip-earlymedia-01.txt (Nov. 2001).

Srisuresh, et al.: Middlebox Communication Architecture and Framework, Network Working Group, Internet Draft, http://www.ietf.org/internet-drafts/draft-ietf-midcom-framework-07.txt (Feb. 28, 2002).

Srisuresh, et al.: Middlebox Communication Architecture and Framework, Network Working Group, Request for Comments 3303, http://www.ietf.org/rfc/rfc3303.txt (Aug. 2002).

\* cited by examiner

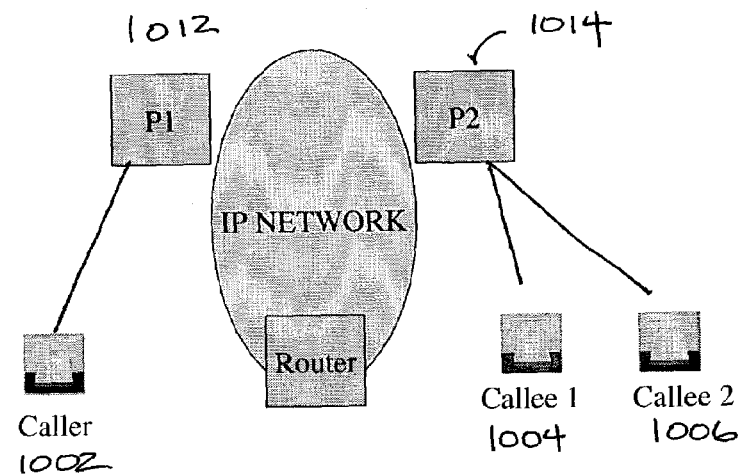
Figure 1: Network Configuration
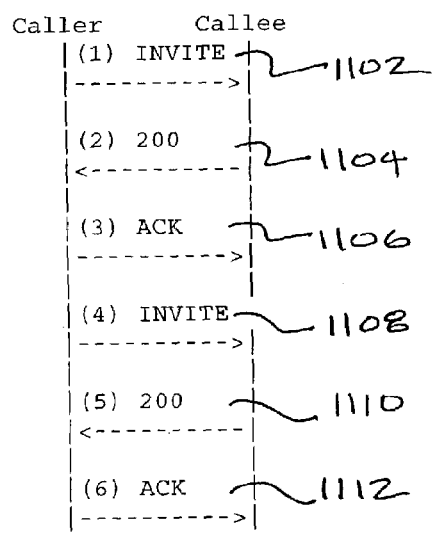
Figure 2: Basic flow for 1of N Negotiation

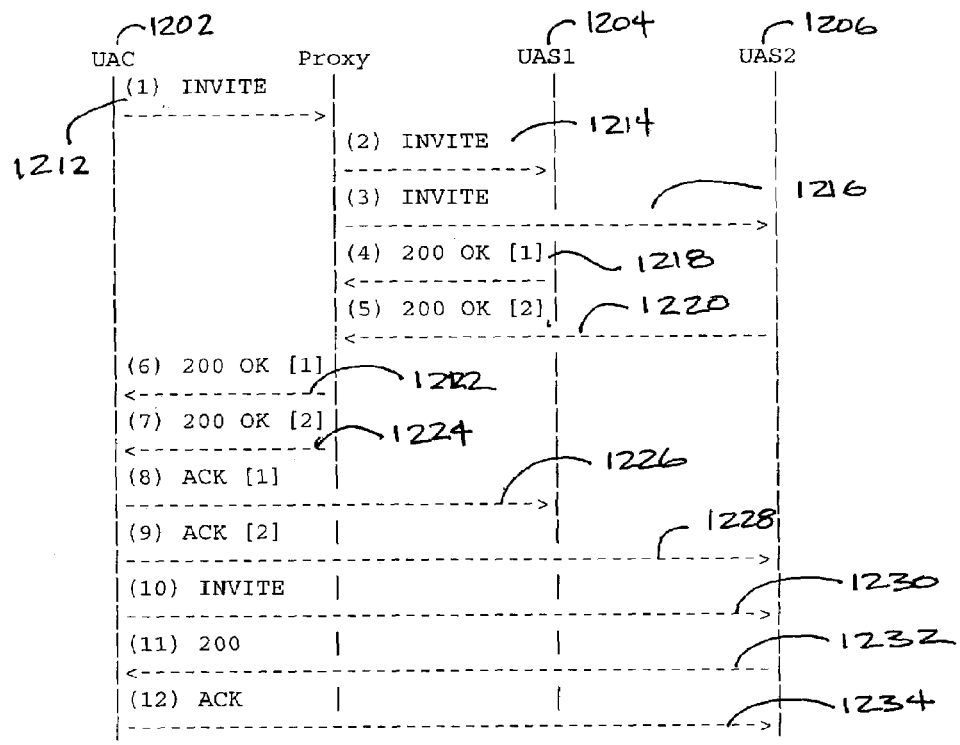
Figure 3: Call flow for changing ports
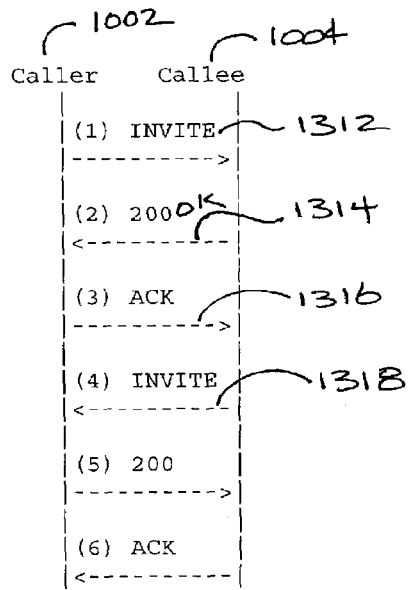
Figure 4: Secure Media Flow

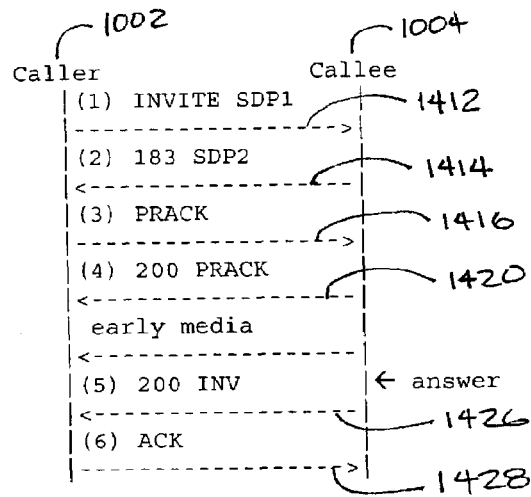
Figure 5: Basic Early Media Flow
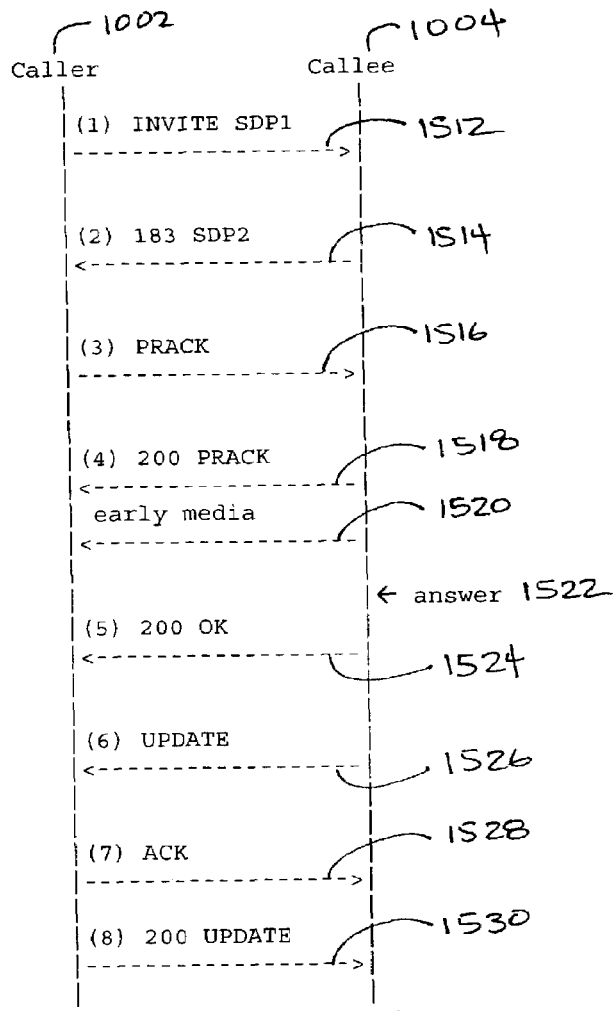
Figure 6: Unidirectional Early Media Flow

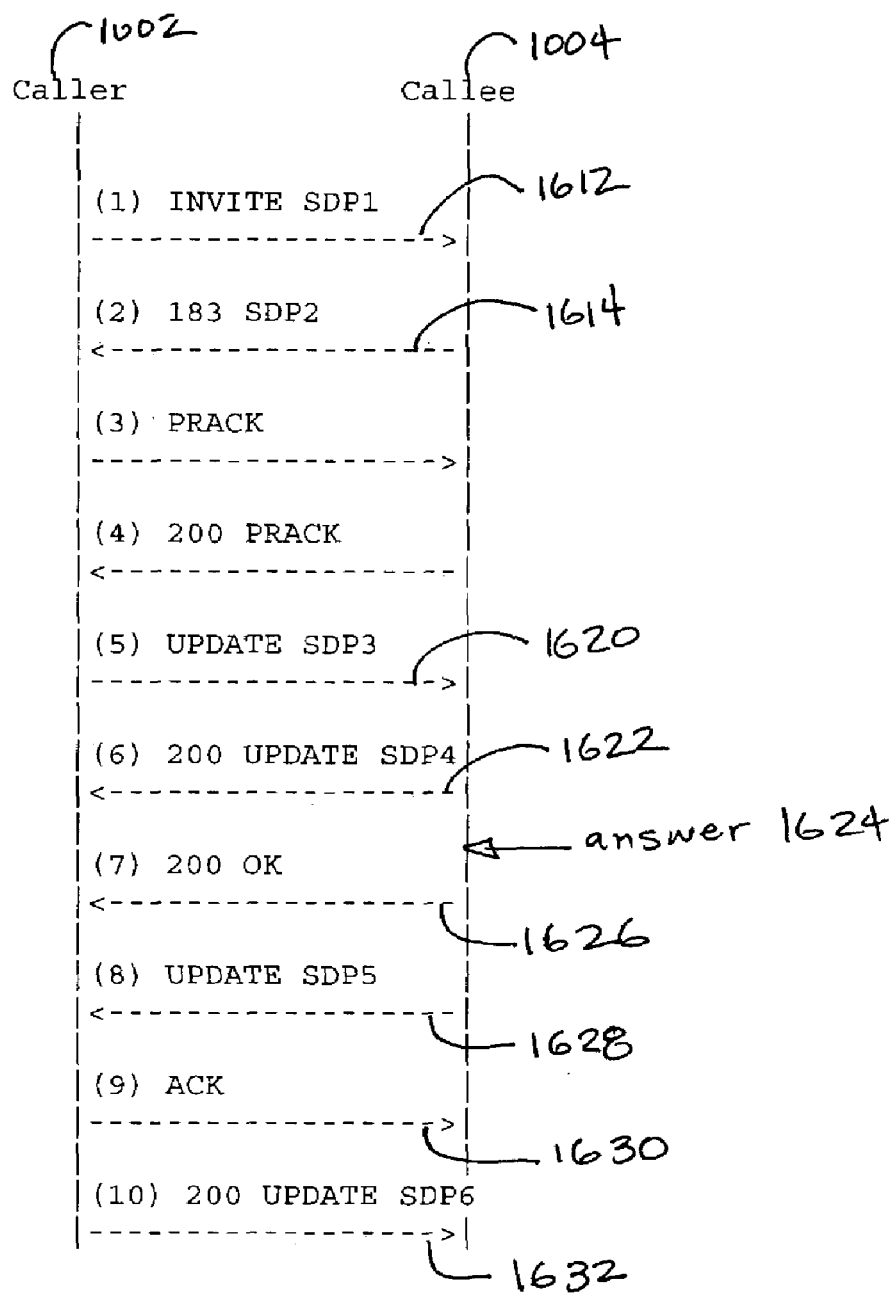
Figure 7: Refusing Early Media

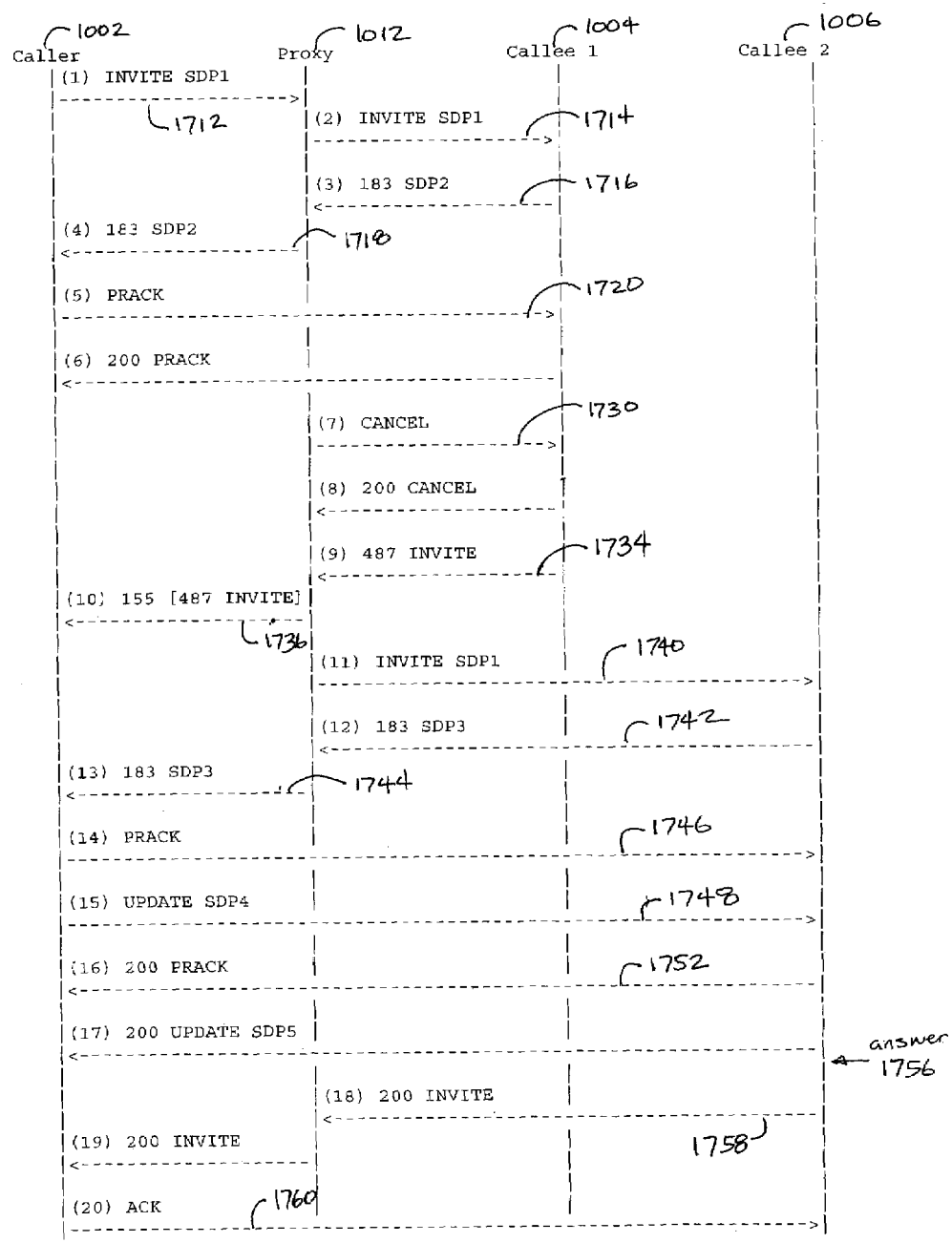
Figure 8: Early Media with Services

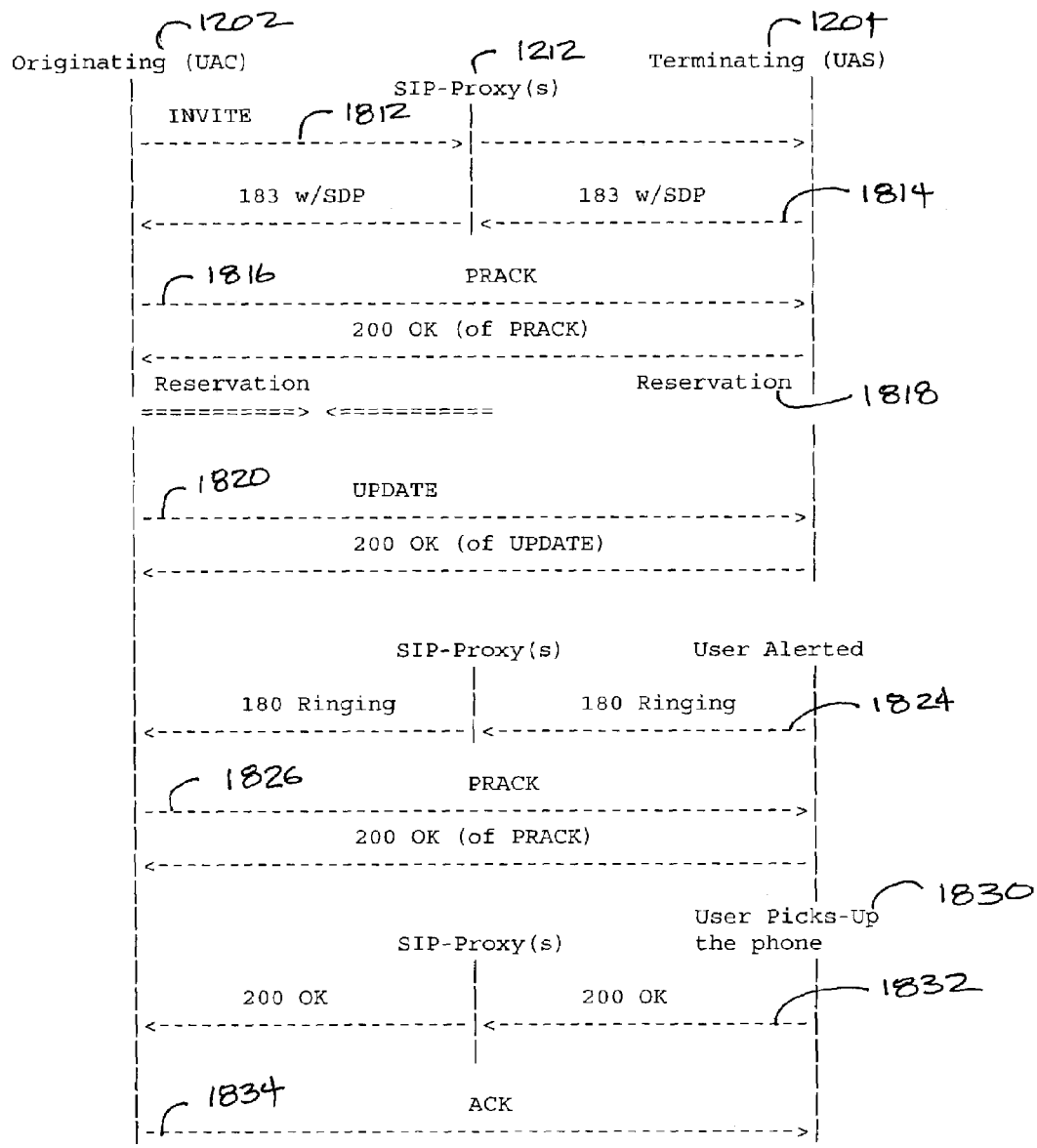
Figure 9: RFC 3312 Basic Flow

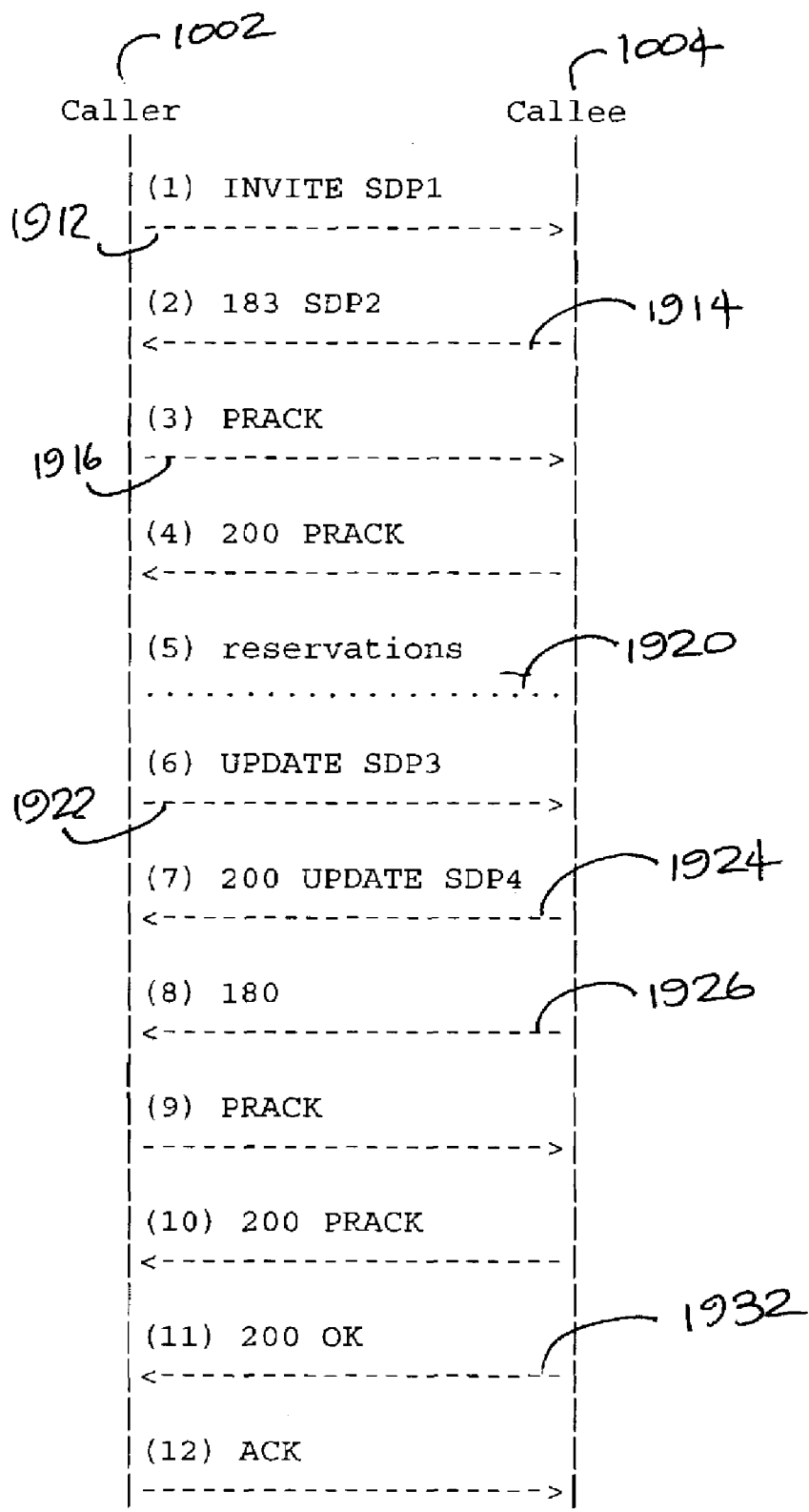
Figure 10: RFC 3312 basic call

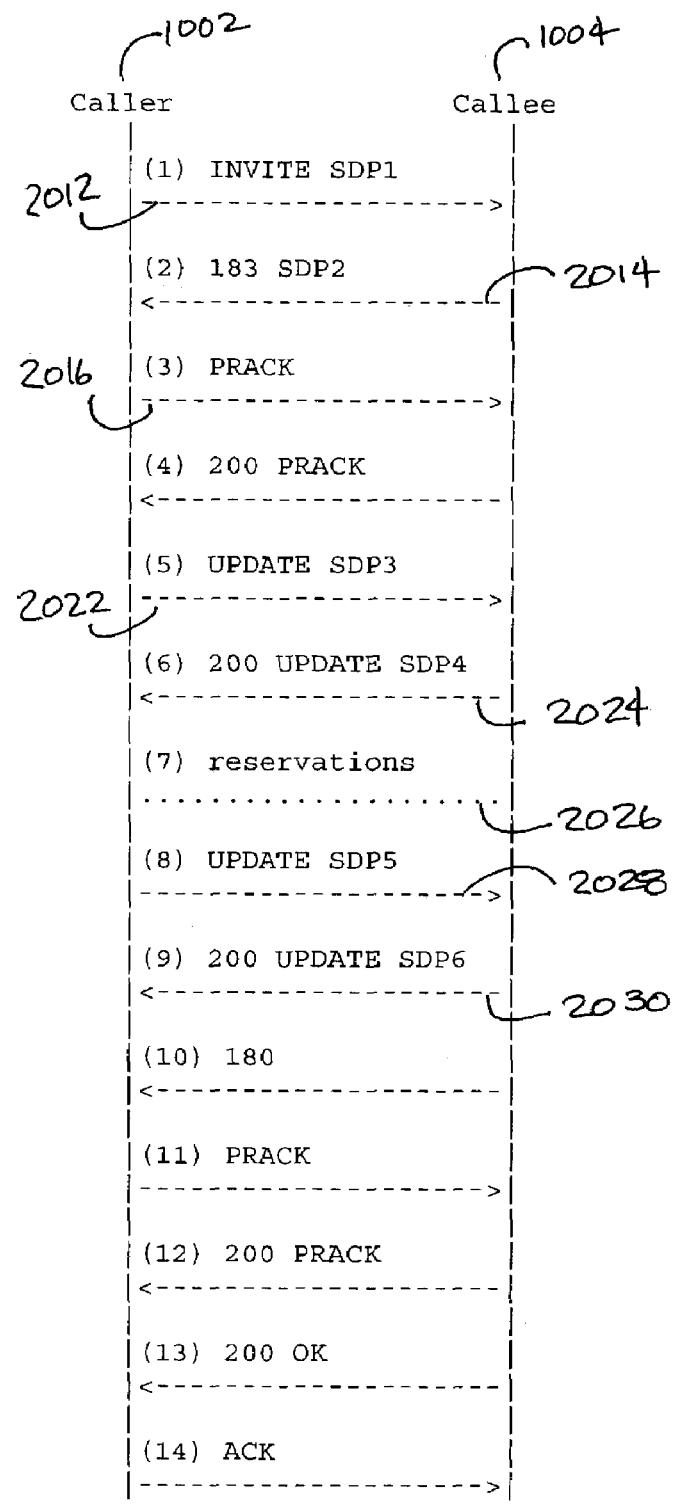
Figure 11: Modifying codecs in RFC 3312

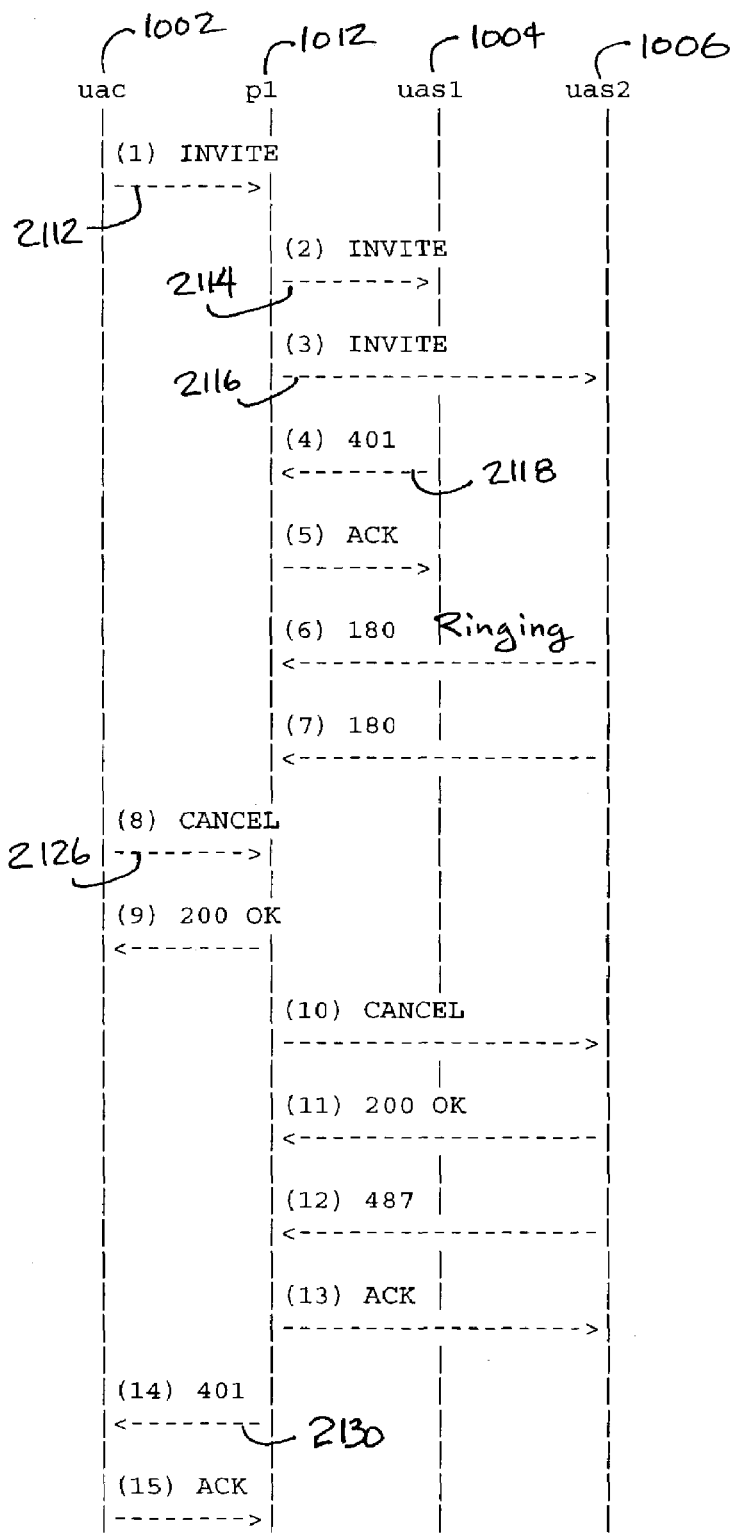
Figure 12: Basic HERFP Case

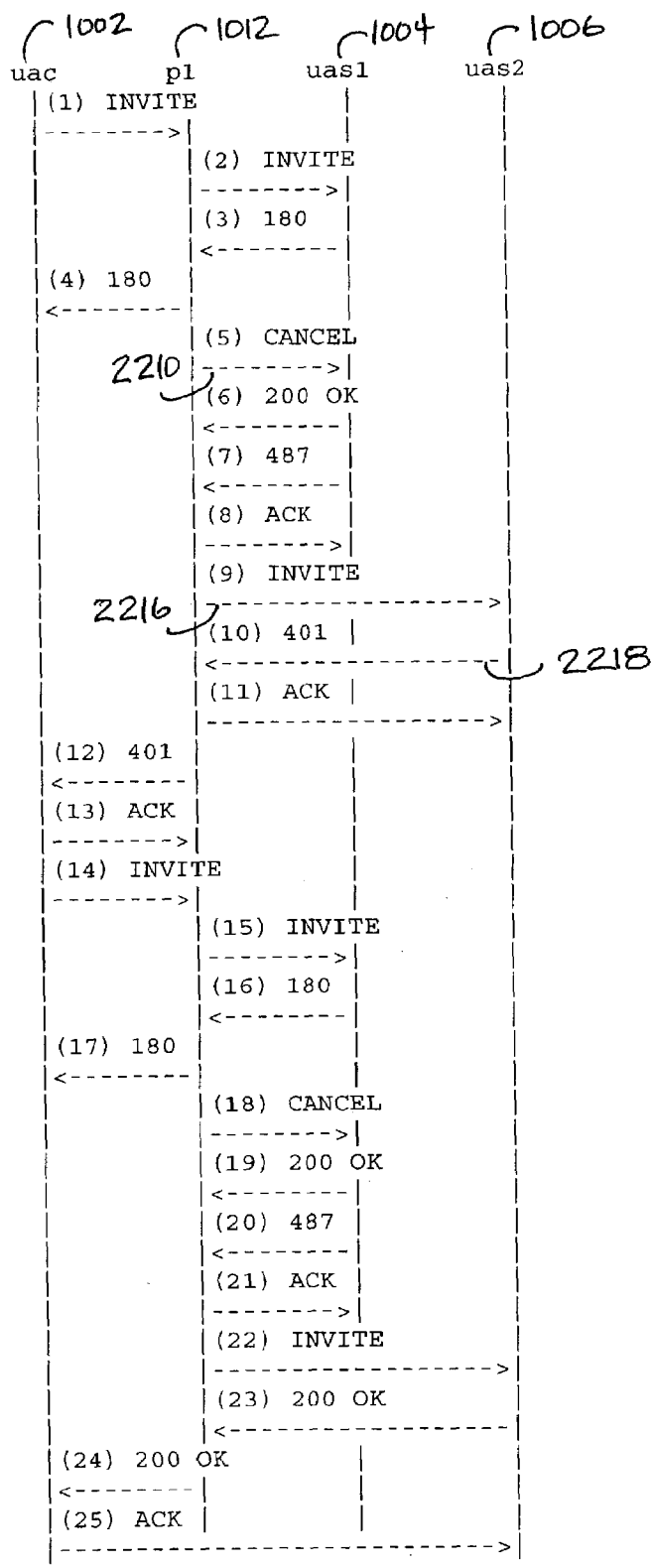
Figure 13: Forking HERFP Case

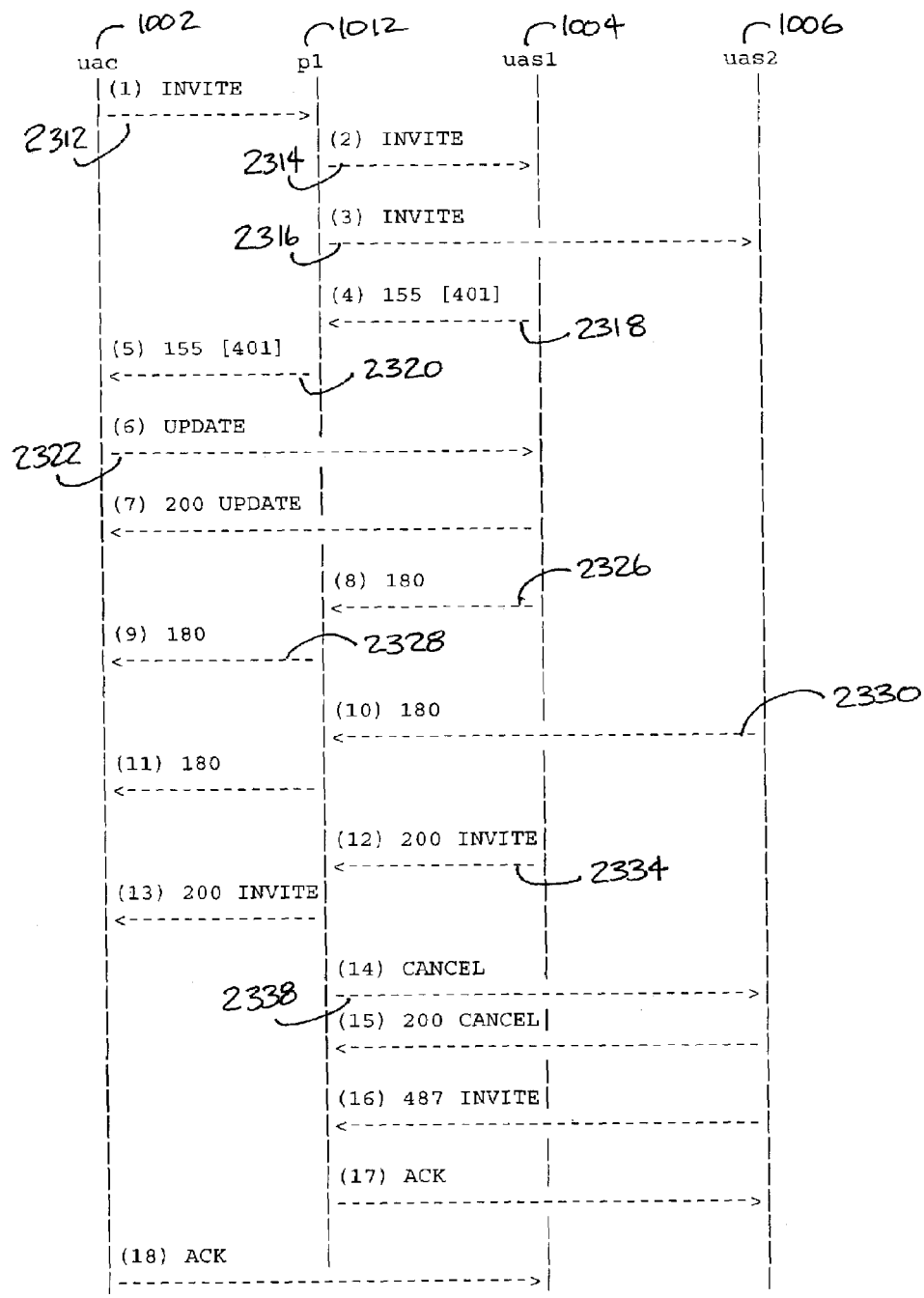
Figure 14: HERFP fix, scenario 1

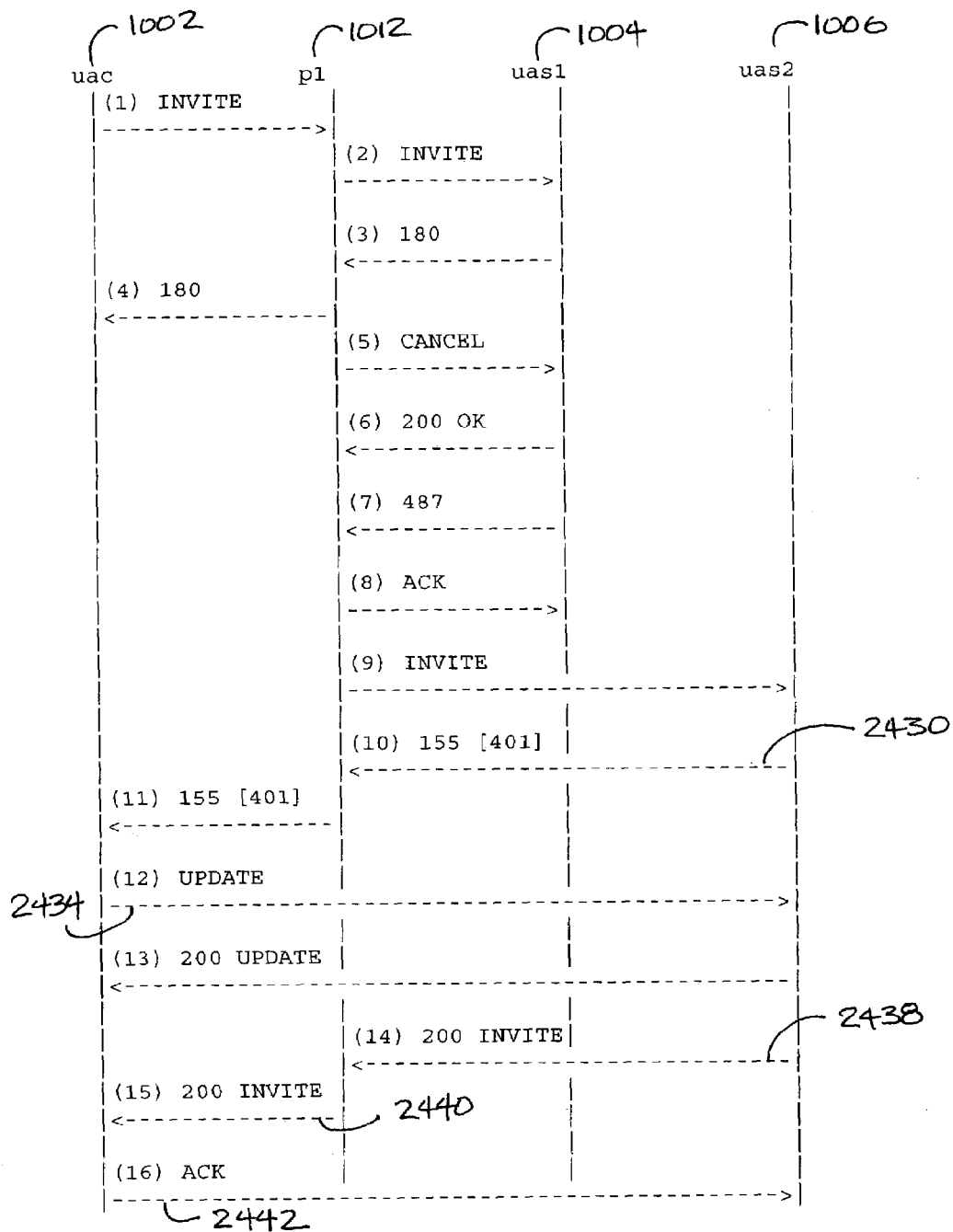
Figure 15: HERFP fix, scenario 2

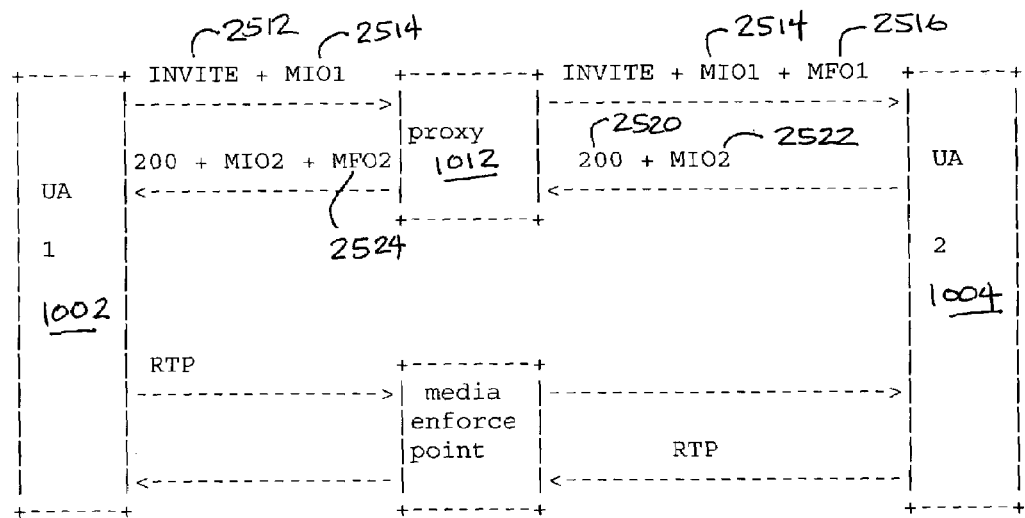
Figure 16: Framework
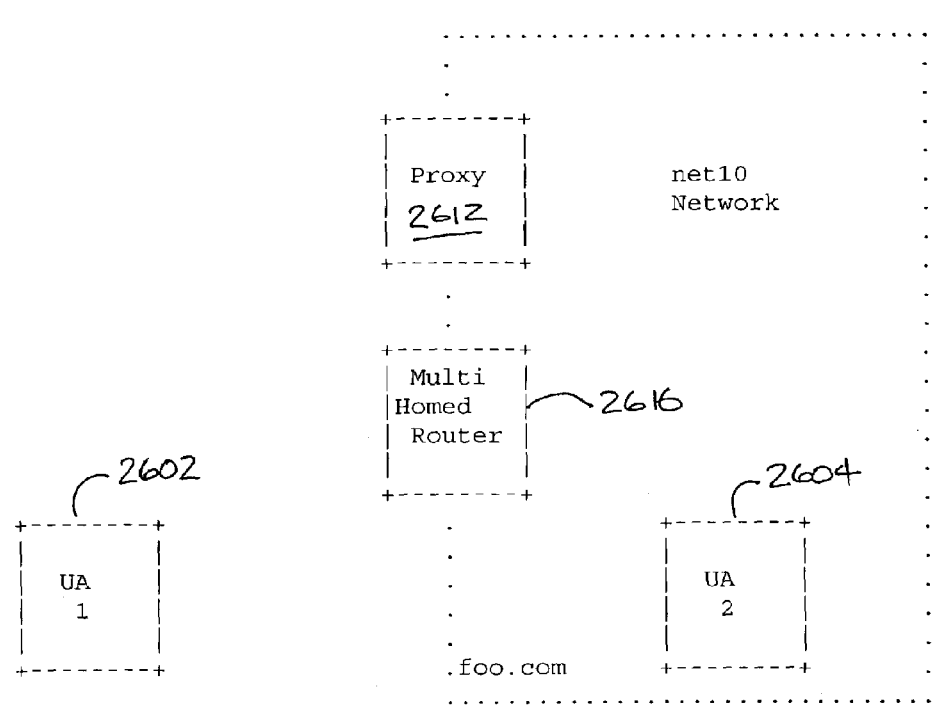
Figure 17: IP in IP NAT Configuration

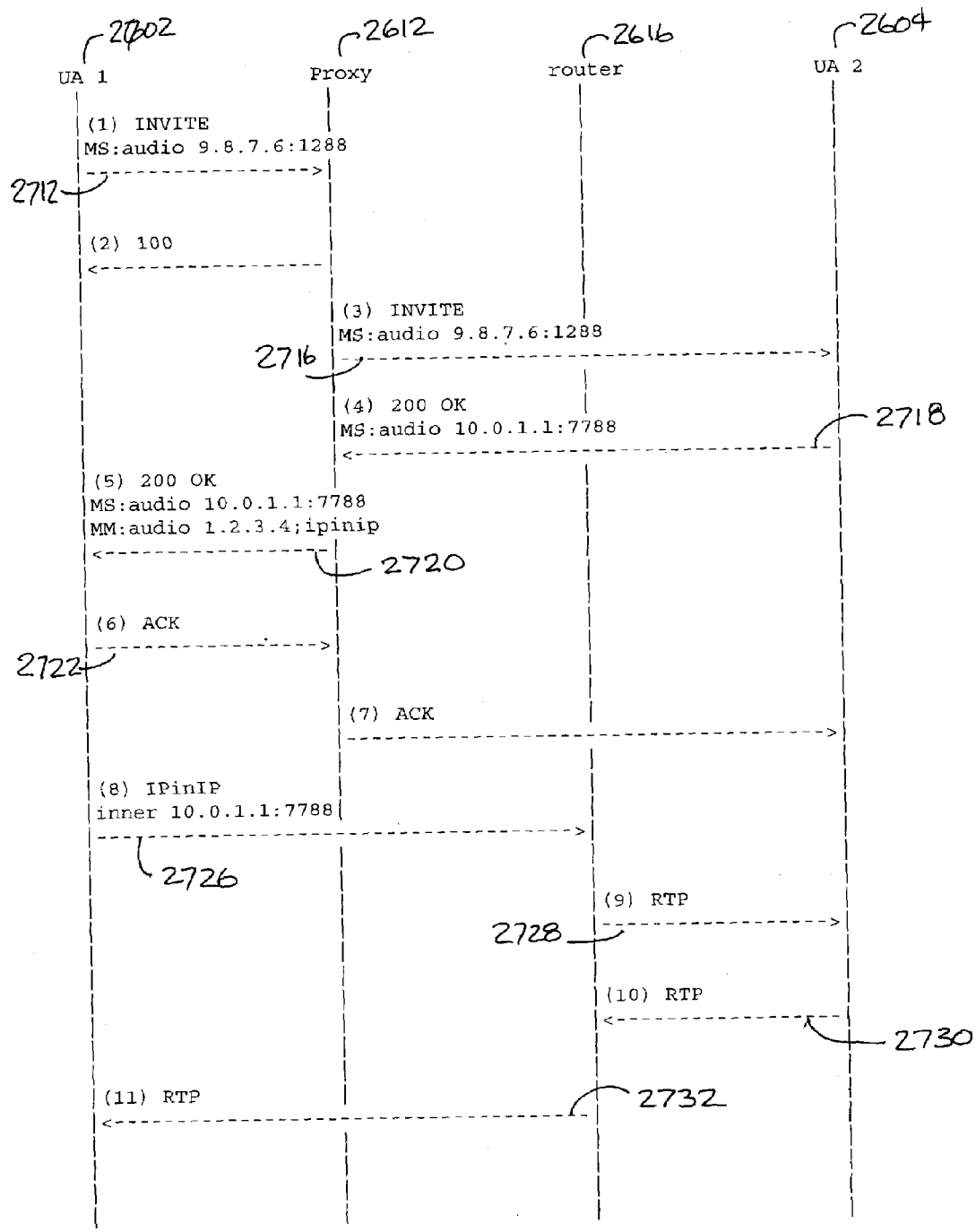
Figure 18: IP in IP Flow

ESTABLISHING AND MODIFYING NETWORK SIGNALING PROTOCOLS

BACKGROUND

This application claims priority from U.S. provisional application Ser. No. 60/348,587 filed Jan. 15, 2002, and U.S. provisional application Ser. No. 60/380,016 filed May 2, 2002. The entire disclosures of these two provisional applications, including all exhibits, are incorporated by reference.

This invention relates to the field of interactive communications over packet networks.

The Session Initiation Protocol (SIP), currently under development within the Internet Engineering Task Force (IETF), provides a standards-based mechanism for initiating, modifying, maintaining, and terminating interactive multimedia communications sessions over packet networks. SIP is typically used to establish and maintain an end-to-end session for media such as audio, video, and messaging. SIP typically operates at the beginning of a media transmission session as a preliminary setup phase - a dialog of messages is exchanged between a caller and callee. The SIP setup portion establishes policies for the media session, typically including the type of media for the session (audio, video, etc.), the relationships between media (for example, that the audio is synchronized with the video), the transport protocol for the media, the network protocol for the media, such session properties as destination, compression algorithms and parameters, and quality-of-service determinations, to trade off cost, bandwidth, quality, packet loss rates, latency, and similar characteristics. In most cases, a caller and callee must agree on these session policies during SIP setup if the media are to be successfully transmitted. After the session is established, the media are typically transmitted by another protocol. SIP is described in J. Rosenberg et al., "SIP: Session Initiation Protocol," Internet Engineering Task Force, IETF RFC 3261.

While SIP is broad in its capabilities, in some cases, and especially in early drafts, the functions were provided in a less-than-ideal manner, or were missing altogether. For example, early implementations of SIP could not handle "early media" ("Early media" includes data exchanged between a caller and callee before a call is answered, or before call setup is completed, for example, in-band ringing, alerting, or network announcements where a caller hears audio or video before the call is set). SIP fails to always ring all phones when a user has multiple devices. SIP cannot handle negotiation of the case where a phone can support many compression algorithms for voice, but only one at a time. SIP early media is described in a number of sources, including IETF draft draft-rosenberg-sip-early-media, and a number of archived IETF emails.

SIP Proxy servers (also known as "proxies") provide call routing, authentication and authorization, mobility, and other signaling services that are independent of the session. In effect, proxies provide signaling policy enforcement. However, the SIP specification allows a proxy to modify only packet headers (SIP precisely defines which components of a packet are "header" and which components are "body"); while a proxy may read packet data, including policy information in SIP message packets (though this is frowned upon), SIP forbids a proxy from modifying packet bodies. In some cases, however, a proxy may wish to set or enforce session policy. Accordingly, the proxy is responsible for enforcing policy that it is unable to affect within the protocol.

Solutions have generally involved breaking the protocol, by allowing proxies to examine and modify packet bodies. Such protocol violations decrease reliability and flexibility.

A "caller" and "callee" are, respectively, the devices that originate a call ("call" is used generically to indicate any communications session supported within a given protocol, and is not limited to plain old telephone service), and the device to which the call is placed or with which the communications session is requested. In some cases, a caller or callee may delegate call setup tasks to an associated agent device, or another device may act as a forwarding agent for the caller or callee.

A "UA" is a "user agent," typically an endpoint node of a network, including callers and callees. A "UAC" (user agent client) is a UA that issues a request, and a "UAS" (user agent server) is a UA that receives and acts on a request. The role of UAC and UAS is determined on a request-by-request basis. During call setup, the caller issues most of the requests to the callee; thus, the caller is the UAC for these requests, and the callee is the UAS. The callee may initiate some requests, for example, requests to modify some policies originally requested by the caller, or requests to terminate the call; for these requests, the callee is the UAC and the caller is the UAS.

The term "SDP" (Session Description Protocol) refers to a protocol representation of the total collection of policies for a given session.

The SIP protocol is generally directed to call setup, that is, the initial handshaking between caller and callee to establish a call. Call setup typically begins with an INVITE message being sent from caller to callee. The INVITE message indicates to the callee that the caller would like to initiate a session, and gives some description of the session that the caller proposes. For example, an INVITE message typically includes, among other things, the SDP that the caller proposes. The caller and callee exchange one or more messages, until both agree on the policies to be used for the call. At the conclusion of call setup, a call is established. The SIP documents refer to the data transmitted in the call (whether that data be voice, video, binary data, etc.) as "media." The term "media" will be used in this document to refer to such data, or similar data transmitted by other protocols.

SIP manages two kinds of state between endpoints. "Dialog state" managed by SIP includes the state needed for SIP itself to operate, including, for example, "is the call up or down," "what is the most recent SIP sequence number I received from the other side," "what is the call ID," and so on. Dialog state becomes essentially irrelevant at the end of the SIP setup phase, as the media session begins. SIP is also responsible for managing and establishing "session state," state that is maintained in the endpoints to control end-to-end media sessions established by SIP, but not used by SIP itself. Session state includes things like the codecs in use, the packetization delay to use, the network quality-of-service parameters, and the like.

A "loose routing protocol" is a directive that requires a packet, or stream of packets to flow thorough a given set of nodes in the network. The routing is "loose" in that it does not specify every single node to be traversed, merely some set of nodes that must be traversed, leaving the remainder of the path to be routed by other routing mechanisms.

BRIEF SUMMARY

In general, in a first aspect, the invention features a method among nodes of a computer network, and apparatus for performance of the method. A client node of a network sends a request message to a server node of the network. The request message is a message in a network messaging protocol that defines (a) a request primitive for making a request from a client node to a server node, the request message using the request primitive, (b) a success response primitive by which the server indicates successful grant of the request, and (c) a failure response primitive by which the server indicates failure of the request primitive. In response to receipt of the request, the server sends a provisional response to the client, and holds in abeyance a success or failure response to the request. In response to receipt of the provisional response, the client sends an amended request to the server. In response to receipt of the amended request, the server sends a response to the client, being a success response or a failure response as defined in the protocol, the content of the response being based at least in part on the amended request.

In general, in a second aspect, the invention features a method and apparatus for performance of the method. A first communications protocol is sued to establish connections between two or more nodes of a network. The first protocol defines a sequence of messages: (a) a first message that invokes a first method in a recipient of the message, the first method establishing a channel at the level of the first protocol between a sender of the message and the recipient according to parameters of the first message that specify characteristics of a second protocol; and (b) a second message that invokes a second method in a recipient of the second message, the second method reconfiguring the characteristics of the second protocol of the recipient, without establishing a channel at the level of the first protocol if no such channel is previously established, and without disrupting a channel at the level of the first protocol if such channel has been previously established.

In general, in a third aspect, the invention features a method performed among nodes of a computer network, and apparatus for performance of the method. An endpoint node of the network sends a message containing information describing a policy for a network communication session. An intermediary node of the network adds new information to the message requesting modification of the policy.

In general, in a fourth aspect, the invention features a method performed among nodes of a computer network, and apparatus for performance of the method. A client node sends a session-invitation message bearing a message header, the message header bearing one or more policies of a session. An intermediary node of the network adds new information to the session-invitation message requesting modification of the policies, and transmits the session-invitation message to a server node of the network.

In general, in a fifth aspect, the invention features a new message, and associated state changes and processing, that can solve many of the known problems in SIP in a consistent and general way.

In general, in a sixth aspect, the invention allows signaling intermediaries, such as SIP proxies, to insert information into signaling messages asking for end points to implement certain session policies. Proxy servers may request media-level policy operations from user agents.

In general, in a seventh aspect, the invention features a method performed during a network communication session. An endpoint node of the session sends a message containing information describing a policy for the session. An intermediary node of the network adds new information to the message requesting modification of the policies.

In general, in an eighth aspect, the invention features a method to be performed during a network communication session. Messages are exchanged between an endpoint node of the session and an intermediary node of the session. The endpoint and intermediary nodes each contribute information to establish a loose route for subsequent session data.

Particular embodiments of the invention may include one or more of the following features. The server's response may be based at least in part on information provided in the request. The provisional response may request additional information from the client, or further information about network nodes between the server and client, for proper processing of the request. The provisional response may request further information about the client, and the amended request provides the requested information. The provisional response may request additional security credentials, a different security parameter, a different payload type, a smaller payload, a set of media encoding mechanisms implemented at the client, a different communications medium type, a set of network address and network port information where media is to be sent and received, a different set of required extensions to the protocol. An intermediary node of the network may fork the request message to two distinct server nodes of the network, at least one of the two server nodes then performing the sending of a provisional response from the server to the client. The amended request may describe two or more distinct policies of a session description. The endpoint node may be a caller initiating the communication session. At least two nodes from the group consisting of the intermediary node, the client node, and the server node, may exchange messages, the two nodes each contributing information to establish a loose route for subsequent session data. The client, server, and/or intermediary nodes may each contribute information to establish set of media encoding formats for the session.

The above advantages and features are of representative embodiments only. It should be understood that they are not to be considered limitations on the invention as defined by the claims. Additional features and advantages of the invention will become apparent in the following description, from the drawings, and from the claims.

BRIEF DESCRIPTION OF THE DRAWINGS

FIG. 1 is a block diagram of a network.

FIG. 2 is a diagram showing the flow of packets in a network.

FIG. 3 is a diagram showing the flow of packets in a network.

FIG. 4 is a diagram showing the flow of packets in a network.

FIG. 5 is a diagram showing the flow of packets in a network.

FIG. 6 is a diagram showing the flow of packets in a network.

FIG. 7 is a diagram showing the flow of packets in a network.

FIG. 8 is a diagram showing the flow of packets in a network.

FIG. 9 is a diagram showing the flow of packets in a network.

FIG. 10 is a diagram showing the flow of packets in a network.

FIG. 11 is a diagram showing the flow of packets in a network.

FIG. 12 is a diagram showing the flow of packets in a network.

FIG. 13 is a diagram showing the flow of packets in a network.

FIG. 14 is a diagram showing the flow of packets in a network.

FIG. 15 is a diagram showing the flow of packets in a network.

FIG. 16 is a diagram showing the flow of packets among nodes in a network.

FIG. 17 is a block diagram of nodes in a network.

FIG. 18 is a diagram showing the flow of packets in a network.

DESCRIPTION

I. Establishing Session Policies Using Non-Call Updates

Referring to FIG. 1 to FIG. 15, SIP may be supplemented with two additional primitives. First, UPDATE primitive 1000 allows caller or UAC 1002 to establish session state attributes of the protocol to be used in a session with callee or UAS 1004, 1006 without actually establishing or modifying the dialog, without requiring modifications to the dialog state. Second, a "More information needed" provisional response, typically with message code 155, may be substituted for some forms of error response, to indicate that a caller or UAS needs more information before a session can be established. Together, these allow two nodes to negotiate or modify session state, e.g., to take advantage of either extended capabilities or limitations of the nodes themselves or the network between, even as the negotiation itself takes place in a dialog framed in a protocol that relies only on features guaranteed to exist.

The UPDATE message 1000 may be used as one message in a dialog (a SIP relationship between peers, similar in concept to a call leg) between SIP devices 1002, 1004, 1006. The UPDATE message 1000 may be sent from either participant to the other participant. When the UPDATE message 1000 is received, the recipient processes the message as if it were an INVITE request (used to establish dialogs), except that unlike an INVITE request, an UPDATE request 1000 does not initiate a session or modify the state of the dialog. For example, if an element receives an UPDATE request 1000, but there is no dialog associated with that request, no dialog is created. This is in contrast to INVITE, where if a dialog did not exist, one would be created. The result of this is that the UPDATE can be used to update non-dialog state, including security credentials, session parameters, and so on, without affecting the state of the call.

UPDATE messages may be used to provide a more robust treatment for failed requests. When caller 1002 sends a request that cannot be processed, because it is missing information, or uses the wrong information (for example, does not include security credentials), the conventional practice is for the recipient of the request to return an error response, so that caller 1002 can generate a new request with the required information. This has the effect of terminating the initial transaction. This can cause problems with network provided services, such as follow me and find-me. A message primitive from callee 1004 back to caller 1002 conveys the specific error condition, but does not terminate the transaction. Caller 1002 then provides the requested information in an UPDATE message. This exchange of messages allows the error to be reported without terminating the original transaction, so there is no impact on network provided When caller 1002 wishes to initiate communications with a user, caller 1002 sends SIP messages to its proxy server 1012 over the IP network. The caller's proxy server 1012 executes originating features, and forwards the call to terminating proxy server 1014 over the IP network, using standard SIP conventions. Callee proxy server 1014 will forward the message, typically an INVITE request, to the devices registered to callee 1004. In the example above, there are two callees 1004, 1006. As a result, the INVITE request is forwarded to one and/or the other callees 1004, 1006, possibly at the same time, possibly sequentially.

On occasion, one of callees 1004, 1006 determines that it requires additional communications with caller 1002 before it can properly answer the call. Reasons for this determination may include:

1. requesting credentials in order to authenticate caller 1002,
2. requesting that caller 1002 communicate with the device to provide early media
3. requesting that caller 1002 provide an alternate format for a piece of content included in the original INVITE, since the format of the content was not understood by the device,
4. requesting that caller 1002 provide an updated version of the request that omits extensions applied to the original INVITE, as the extensions were not understood by callee 1004.

A SIP callee 1004 may request this information by generating an error response. This error response terminates the INVITE transaction (and thus ends the call attempt). Caller 1002 may then create a new INVITE with the requested information, and send it. This new INVITE would trigger reinvocation of network services, such as call-forwarding, follow-me, and so on.

Alternatively, instead of sending an error response, callee 1004 sends a 155 provisional response. A SIP provisional response is a response that does not terminate the transaction, but provides additional information to caller 1002. This 155 provisional response looks identical to the error response that would have been sent, but instead has a different response code and reason phrase. The response code and reason phrase that would have otherwise been used are instead provided in the Reason header in the response. One example design for Reason headers is specified in IETF RFC 3326.

For example, if the request had not contained credentials, the error response sent by callee 1004 might have been:

SIP/2.0 401 Unauthorized
From: sip:joe@company.com;tag=134
To: sip:bob@company.com;tag=2298
Authorization: Basic realm="company.com"
Call-ID: 9asd7hsjda@1.2.3.4
Cseq: 99776 INVITE
Via: SIP/2.0/UDP 1.2.3.3

However, instead, callee 1004 will send:

SIP/2.0 155 More information needed
Reason: SIP;cause="401"
From: sip:joe@company.com;tag=134
To: sip:bob@company.com;tag=2298
Authorization: Basic realm="company.com"
Call-ID: 9asd7hsjda@1.2.3.4
Cseq: 99776 INVITE
Via: SIP/2.0/UDP 1.2.3.3

This 155 provisional response conveys the same information as the error response, but does not terminate the transaction. This 155 provisional response will be propagated to caller 1002 through any intermediate proxies 1012, 1014, even if they are unaware of the extended UPDATE message protocol.

A 155 provisional response may provide full disclosure to caller 1002 about what has happened to a call. Progress on all the tried branches and their results may be communicated back to caller 1002.

Upon receipt of the provisional response, caller 1002 generates an UPDATE request. The UPDATE request looks identical to the INVITE request that would have been generated in response to the actual error response that is "represented" by the 155 provisional response. This UPDATE may be sent in the same manner as any other SIP mid-dialog request, and will be received by the device that generated the 155 "More information needed" request. The recipient processes the UPDATE as if it were INVITE, with the following differences:

(1) UPDATE does not modify dialog state. If the call is unanswered, it remains unanswered.

If no call existed when UPDATE is received, no call will exist afterwards.

(2) An UPDATE can overlap the INVITE transaction, even though INVITE itself cannot overlap another INVITE transaction.

Since the original transaction has not been answered, services in caller proxy 1012 that use the response to the original request to drive services (such as follow-me, find-me, etc.) are unaffected by the UPDATE request and the 155 provisional response. Both the UPDATE and 155 provisional response are ignored by the proxy. However, the two messages together may update information about the session, credentials, etc. at callee 1004 as needed for the call to proceed.

UPDATE can be sent at any time, even after the dialog is established. In that sense, it may work like a re-INVITE, but unlike a re-INVITE, UPDATE does not establish a new dialog.

UPDATE's should not overlap, and the request glare procedures of IETF RFC 3261, may be applied in order to ensure that UPDATE's in each direction do not occur simultaneously.

These principles may be applied to negotiation of early media. An UPDATE message can be used to modify the state of the media session independently of the call/dialog, providing a total separation between them. This is discussed further in section II.D, below.

The UPDATE message may be applied to establish satisfaction of preconditions. The preconditions specification, IETF RFC 3312, uses UPDATE as a way to specifically signal that a precondition is met. Resource reservations may be modeled as another component of the media session, which can be updated and modified using UPDATE as would any other parameter of the session, such as media direction or codec set. This generalization allows for additional cases to be signaled with SIP that are not possible using the current definition of UPDATE, but which are readily possible with our defined behavior above. The detailed usage of UPDATE for these purposes are documented in section II.

II. Example Uses

II.A. One-of-N Codecs

SIP gateways and hardphones may use DSP chips for speech compression and decompression. Most DSP's can support a wide variety of codecs, but only one codec can be loaded at a time. Caller 1002 can send an INVITE that includes SDP that lists all of the caller's codecs. However, in typical offer-answer specifications, for example, RFC 3264, the definition of such SDP is that caller 1002 supports the ability to dynamically change between all listed codecs mid-call. In many cases, caller 1002 may not support such changing.

Referring to FIG. 2, in an example call flow, the initial INVITE 1102 contains SDP with the desired streams. Each stream lists all of the codecs supported by the UA, even if they cannot be supported simultaneously. The media stream has a direction of "inactive," to indicate it is not yet started.

When the 200 OK 1104 arrives, it is ACK'ed normally 1106. The 200 OK 1104 will have an m line with a subset of the codecs supported by callee 1004. If simcap is used (IETF RFC 3407), caller 1002 will have additional information on other codecs as well. In parallel with ACK 1106, caller 1002 sends a re-INVITE 1108, this time with an m line with a single codec, which is one of the ones supported by the UAS. The media stream also changes to sendrecv, activating it. This generates its own 200 OK 1110 and ACK 1112.

This flow has many of the same desirable properties as most other proposed solutions for the 1-of-N codec problem, for example, three-way handshaking. It may support a clear semantic for expressing the constraint that only one of N codecs can be supported at once. In addition, it may provide additional advantages of backwards compatibility, reduces the possibility that the second INVITE and call goes to a different device due to routing changes, and may provide a unified mechanism for handling a number of cases. The only drawback is an additional message exchange, although there is no latency associated with that, just message overheads.

The ACK overhead can be avoided by using an UPDATE request instead of the second re-INVITE, which would allow the codecs to be changed before the call has even been accepted. This approach may further reduce call setup time.

II.B. Change Ports on Forked 2xx

When caller 1002 issues an INVITE, it contains the port and IP address in the SDP where media should be sent to. If this INVITE should "fork", meaning it is delivered to multiple recipients, each of them can answer. Each callee 1004, 1006 will begin sending media to the address and port provided in the INVITE. Caller 1002 will therefore receive two distinct media streams on the same port and address. In many cases, for RTP, they will be distinguishable with the SSRC parameter ("RTP" is A Transport Protocol for Real-Time Applications, as described in IETF RFC 1889. "SSRC" is a parameter within RTP, "synchronization source," an indication of a timing reference used to maintain synchronization between two channels, for instance, between audio and video.) However, it is possible (although remotely) that both will pick the same SSRC, resulting in serious media confusion.

In some cases, this may be resolved by a three-way handshake. The INVITE does not contain SDP, and therefore has no port/address information. The 200 OK contains the port and address of callee 1004, and the SIP ACK message, sent from caller 1002 back to callee 1004, contain the port and address for that particular recipient. This approach avoids the media confusion. However, this approach may result in clipping of a round trip time (RTT) worth of any media sent by callee 1004 immediately after callee 1004 answers.

Referring to FIG. 3, in a typical call setup, the initial INVITE 1212 contains an m line with a valid port and address, which the UAC 1202 is listening on for media. The proxy forks this request 1214, 1216 to UAS1 1204 and UAS2 1206, each of which respond with a 200 OK 1218, 1220. The proxy forwards 1222, 1224 both of these to the UAC. The UAC ACK's 1226, 1228 both 200 OK's. However, with the 200 OK 1220, 1224 from UAS2 1206, in parallel with ACK 1228, UAC 1202 generates a re-INVITE 1230 that changes its receive port for the session with UAS2 1206. This results in a 200 OK 1232 an ACK 1234 as normal.

The result is that media from UAS1 1204 and UAS2 1206 will go on separate ports, allowing UAC 1202 to associate a media stream with a particular dialog. The latency for such establishment is essentially identical to the proposed three-way handshake for this case. The INVITE approach of FIG. 3 may provide further benefits. For example, it may be backwards compatible with existing UA. Second, if there was no forking, the flow may avoid media clipping. The proposed three way handshake will always suffer media clipping. Media clipping only occurs here if there is forking, in which case the media may be mixed or garbled for one round-triptime until the port is changed. If such garbling is not acceptable, the SDP in INVITE 1212, 1214, 1216 can indicate an inactive stream, and then the stream can be changed to active in the re-INVITE 1230. This avoids garbling but will clip the media, just as the alternate proposed three way handshake will.

The cost of an additional INVITE/200/ACK exchange may be reduced by using UPDATE instead as a replacement for the re-INVITE 1230, at the expense of backwards compatibility.

II.C. Secure Media

SIP can establish media that runs over. RTP, as described at IETF RFC 1889. More recently, a secure version of RTP, called SRTP (Secure Real Time Transport Protocol), IETF draft draft-ietf-avt-srtp, has been developed. However, SRTP is not backwards compatible. Caller 1002 may be able to indicate that that it has both RTP and SRTP capabilities, and then callee 1004 picks one, followed by caller 1002 responding with the specific address and port for the media stream.

Alternatively, a three way exchange be used, as described in IETF archived message 00664. This is a different exchange than the one discussed above for the one-of-N codecs case; rather, in this exchange, the INVITE contains a complete set of capabilities, and an offer comes in the 200 OK, followed by an answer in the ACK.

This approach suffers the problem that it is not backwards compatible, and also clips an RTT worth of media after caller 1002 picks up.

Referring to FIG. 4, the flow for the secure media case is very similar to the one-of-N flow in FIG. 2. An initial INVITE 1312 uses regular RTP, but simcap is used to indicate support for SRTP. The 200 OK 1314 and ACK 1316 result in establishment of a media session using regular RTP. However, callee 1004 knows that caller 1002 supports SRTP (from simcap). So, callee 1004 initiates a re-INVITE 1318, changing the profile to SRTP.

II.D. Early Media

Aspects of SIP early media sessions may need to be changed before the call is accepted. This includes rejecting streams, modifying streams, placing them on hold, adding media to them, and so on.

Referring to FIG. 5, in the basic flow for an early media session, caller 1002 sends INVITE 1412 with SDP 1 in it. This is a normal SDP, providing a receive address and port for a single sendrecv audio stream. Caller 1002 supports 100 rel, so it includes a Supported header in INVITE 1412 indicating such support. The Allow header also indicates support for UPDATE.

In the example of FIG. 5, UAS 1004 decides to generate early media. So, UAS 1004 answers the original INVITE 1412 with a 183 Session Progress 1414, which is sent reliably. This 183 Session Progress 1414 contains SDP, which is an offer to the initial answer. The answer does not change the directionality of the stream, implying that media can be sent in either direction. Upon receipt of the answer in the 183 Session Progress 1414, the session is established (although the dialog is not). Caller 1002 sends a PRACK request 1416 to acknowledge receipt of the 183, and caller 1004 answers the PRACK with a 200 OK 1420. Caller 1002 hears the early media 1422. Finally, callee 1004 answers (step 1428), generating a 200 OK 1426. Since there is no need to modify any aspect of the session description, the 200 OK 1426 does not contain any SDP, and therefore neither does the ACK 1428. The impact of OK 1426/ACK 1428 is only to update the dialog state, moving it to "established."

FIG. 6 illustrates a case in which UAS 1004 would like to use unidirectional early media, from callee 1004 back to caller 1002. The initial INVITE 1512 from caller 1002 may be essentially identical to INVITE 1412 in FIG. 5. However, the SDP in the 183 Session Progress 1514 differs. The media stream is marked as sendonly, indicating a unidirectional flow from callee 1004 to caller 1002. Caller 1002 sends a PRACK request 1516 to acknowledge receipt of the 183, and caller 1004 answers PRACK 1516 with a 200 OK 1518. The user hears the early media. Once the call is answered, callee 1004 needs to change the directionality to bi-directional. To do that, it generates a 200 OK 1524 to the INVITE (answering the call). This 200 OK 1524 contains no SDP. At the same time, it issues an UPDATE request 1526, containing a new offer that changes the media direction to bidirectional. The caller 1002 generates an ACK 1528 in response to 200 OK 1524 and a 200 OK 1530 to respond to UPDATE 1526. There is a smooth transition of media from early to bidirectional in this case.

FIG. 7 shows the flow for refusing an early media session. The flow starts like FIG. 5. However, when UAC 1002 gets the answer in a 183 Session Progress 1614, which establishes the session before the dialog is answered, caller 1002 decides to change it. Caller 1002 immediately issues an UPDATE 1620 with a new SDP that sets that media stream to inactive. This is answered in the SDP in the 200 OK 1622 response to UPDATE 1620. The stream is now inactive, so callee 1004 sends no early media. However, when the call is answered 1624, callee 1004 decides to try to restart the session. To do that, callee 1004 generates a 200 OK 1626 to INVITE 1612 (answering the call). This 200 OK 1626 contains no SDP. At the same time, callee 1004 issues an UPDATE request 1628, containing a new offer that changes the media direction to bidirectional. Caller 1002 generates an ACK 1630 in response to the 200 OK 1626 and a 200 OK 1632 in response to UPDATE 1628.

Callee 1004 may have the option to delay turning the media stream back on until after the 200 OK 1626. Alternatively, if UAS 1004 doesn't do anything to re-enable the stream, the caller 1002 can offer to do so in an UPDATE or re-INVITE immediately following the receipt of the 200 OK 1626 (which would presumably have no SDP).

In some cases, refusing early media can lead to clipping of the "regular" media once the call is established. Separating the concept of media sessions from dialogs may reduce the number of special cases that must be addressed in establishing the content in the media stream upon acceptance of the dialog.

FIG. 8 shows a call forward no-answer service in a proxy, where the initial UAS 1004 uses early media to provide ringback, as does the second UAS 1006 that is rung. The initial INVITE 1712 has a single audio -stream listing the address and port for receiving media. This is sent to a proxy 1012 that is executing the service. Proxy 1012 first forwards the INVITE 1714, 1718 to callee 1004. Callee 1004 returns an SDP answer in the 183 Session Progress 1716, 1718 establishing the session as in the flows above. Since proxy 1012 does not record-route, PRACK 1720 is sent directly to callee 1004. No UPDATE is issued by the caller 1002, and it therefore receives the media on the address and port from SDP 1. At some point later, the proxy decides to try the next address. So, it CANCEL's the INVITE (message 1730). This generates a 487 Request Terminated 1734 to the initial INVITE. Now, the proxy decides to use the new 155 "More information needed" provisional response code. A 155 provisional response may be used in cases where a UAS wants to report an error to the caller, but does not want to terminate the dialog or the call attempt. The- 155 provisional response contains a Reason header which describes the error, to pass on the 487 Request Terminated (message 1736). This 155 "More information needed" 1736 message gives caller 1002 some indication that the attempt to contact callee 1004 has failed. This caller 1002 can use this in any way it chooses; for UI benefits, or simply discard it. In this instance, it is useful for caller 1002 to determine that the early dialog with callee 1004 is terminated. One use for such information is to know that no more media will come, and therefore, the port from SDPI is safely reusable for any further media from a different UAS. However, in this flow, the 155 "More information needed" is ignored by caller 1002 and not used for that purpose.

The proxy now proceeds to contact the second callee 1006 with an INVITE 1740. Second callee 1006 also responds with a 183 Session Progress 1742, 1744 with SDP. Since this 183 Session Progress 1742, 1744 is provided on a separate dialog, caller 1002 knows that this is a different answer to its initial offer. So, it sends a PRACK 1746, and then UPDATE 1748 to provide a new port for receiving the second media stream. The UPDATE 1748 is responded to with an answer (message 1752), which changes no aspect of the media sessions.

When callee 1006 answers 1756, callee 1006 generates a 200 OK 1758 and caller 1102 generates ACK 1760, both without SDP. There is no change in media, and thus a smooth transition from early to final media with callee 1004.

This flow emphasizes how the various exchanges to manipulate the media composition of the "early sessions" is done with minimal specialization of proxy 1012. The services it provides are unaffected by the media changes, since its services are based on INVITE's 1712, 1736. The proxy services required could be provided by an off-the-shelf RFC3261 compliant proxy.

II.E. Coupling of Resource Reservation and Signaling

The current design for SIP resource reservation and signaling is the so-called "manyfolks" specification, IETF RFC 3312. RFC 3312 presents a plan for coupling of resource reservation to dialog state. Caller 1002 would like to be able to setup a call, and ring callee 1004, only if resources can be reserved for the call. However, other nodes in the network need to signal to callee 1004 in order to obtain the information required to perform resource reservation. The result is a chicken-and-egg problem. One solution is to include preconditions in the INVITE, which effectively tell callee 1004 that it shouldn't ring the phone until resources have been reserved, security has been set up, or some other precondition has been met. Once the conditions are met, an UPDATE request is sent by either side to indicate this fact, so that ringing can occur and call setup can proceed.

Referring to FIG. 9, RFC 3312 accomplishes this by a call exchange. Initial INVITE 1812 contains SDP with a precondition on a media stream. The precondition typically indicates that the call should not proceed unless bidirectional resources can be reserved for the media stream. UAS 1204 returns a 183 Session Progress response 1814 indicating acceptance of this precondition, and providing enough information for UAC 1202 to begin performing resource reservation. This 183 Session Progress 1814 is acknowledged with PRACK 1816. PRACK 1816 may contain additional SDP that updates the codec sets against which reservations are done. Once reservations are made 1818, UAC 1202 sends an UPDATE 1820 to UAS 1202, with SDP as well. The SDP of UPDATE 1820 may indicate that the precondition has been met (i.e., resources have been reserved). This is done by an attribute in the SDP that indicates that the reservation is confirmed. Once that has been sent, UAS 1204 can begin alerting callee 1004, and it therefore sends a 180 ringing message 1824, which is acknowledged with PRACK 1826. Once caller 1002 accepts 1830, a 200 OK 1832 is sent, without SDP. This is ACK'ed 1834 as well.

The parameters described in RFC 3312 may be modeled as additional pieces of state about the media stream. In particular, the strength-tag and direction tag combined indicate the current reservation state of the stream. Mandatory and optional indicate that there is no reservation in place, but one is needed. The value of succeeded indicates that a reservation exists, failed means the attempt was made but failed.

In some cases, a single variable may describe the state of the actual reservation, which is a Boolean flag (on or off) plus a direction. This variable may be a shared parameter (that is, a media parameter whose value is negotiated since both sides have input to it), much like the direction attribute. When either end 1202, 1204 learns information about the state of the reservation, they may update this parameter and send it in an UPDATE. The reservation state can change in many ways. For example, it can fail, and therefore revert to bi-directionally reserved to no reservation at all. This is quite separate from the precondition, which is maintained as a separate variable. The precondition includes a value of the reservation state that must be achieved before proceeding with the call, and a strength (mandatory, optional). The precondition itself can be negotiated, since it, too, like the reservation state, is a shared parameter.

The precondition is met when the state of the reservation equals, or exceeds, the precondition. The precondition may be met if the precondition is for one direction, but the reservation state gets established bi-directionally. An absolute order of the values of the reservation state may be defined to improve correctness of operation, and to allow a concise statement on preconditions. Specifically, the state of the precondition and the state of the reservation can both evolve over time through updates in UPDATE, initiated by either side. Once the states reach a point where the reservation state meets or exceeds the precondition value, callee 1004 can be alerted and the processing continues.

The confirm tag in RFC 3312 may be viewed as a single-ended parameter (that is, a parameter whose state is not negotiated, but rather, each side provides its own instance of the parameter) that requests for a new offer when the state of the reservation changes to a particular value, without precisely describing a reservation state.

The use of UPDATE messages may reduce the need for separate "precondition" Content-Disposition described in RFC 3312, because the various SDP exchanges are essentially similar to normal SDP offer/answers.

Referring to FIG. 10, in a basic call without early media, the packet flow using UPDATE's, using a pure offer/answer model, moves the SDP from PRACK's to UPDATE's. Caller 1002 sends an INVITE 1912 with SDP 1. This SDP has a single audio stream, which indicates a strength of mandatory, a direction of sendrecv, and a confirmation. INVITE 1912 has a Require header to indicate that the UAS 1004 has to support preconditions. UAS 1004 receives the INVITE 1912, and notices the required precondition processing. The precondition indicates that sendrecv reservation has to be in place before proceeding with the call. UAS 1004 returns a 183 Session Progress 1914 with an answer to the SDP. This answer also indicates a mandatory precondition, with sendrecv directionality, and confirmation. UAC 1002 sends a PRACK 1916. Both sides perform resource reservation, and both succeed. The UAC issues UPDATE request 1922. From the perspective of UAC 1002, the state of the reservation state for the media stream is now successful in the receive direction,-so the SDP in UPDATE 1922 indicates that reservation state. Since UAS 1004 has also succeeded, it knows that the state of the reservation is actually sendrecv, and so the answer in the SDP attached to the 200 reply 1924 updates the state to successful in the sendrecv direction. Since this is the precondition, the UAS can now proceed with the call. It alerts the user, returns a 180 ringing 1926, and eventually answers the call. Note that neither the 200 or ACK contain SDP.

This flow may be used to support early media. Once the response 1924 to UPDATE arrives, the stream is active and the reservations have succeeded, and thus, early media can be sent. If caller 1002 wished to avoid early media, the initial offer in INVITE 1912 would indicate an inactive media stream, which could be updated to sendrecv in an UPDATE sent by callee 1004, immediately after sending the 200 OK 1932. The result is that there is no special case required for early media, because early media may be treated a part of the normal session data.

Referring to FIG. 11, since the exchanges are just the normal offer/answer, other aspects of the media streams can be updated, in addition to the reservation state. For example, the codec set can be modified, in order to perform resource reservation for the bandwidth requirements of a specific codec, rather than a set. The call proceeds initially as in FIG. 10. However, once the answer comes in the 183 Session Progress 2014 (the receipt of which is acknowledged with the PRACK 2016, UAC 1002 decides to modify the codec set. So, UAC 1002 generates a new offer in UPDATE 2022. The SDP in this UPDATE 2022 request lists only a single codec. The reservation state and preconditions in that SDP remain unchanged. The answer in the 200 OK 2024 to the UPDATE also indicates no change in reservation or precondition state, but confirms that a single codec is in use, and that is used to guide the reservations.

At this point, both sides can perform resource reservation 2026 for the bandwidth required for that one codec. When the reservations 2026 are complete, caller 1002 now knows that the reservation state has changed. Since reservation state is just another session parameter, it can be modified with an UPDATE request. So, caller 1002 sends UPDATE 2028 with a new offer containing the new value of the reservation state. Specifically, the SDP in that offer indicates that the reservation state has succeeded in the receive direction (assuming RSVP is used for resource reservations. RSVP is the "Resource Reservation Protocol" specified in IETF RFC 2209, a mechanism that may be used to reserve network resources). UPDATE 2028 arrives at callee 1004. Since callee 1004 has also succeeded in their reservation (which was in caller-to-callee direction), callee 1004 now knows that bi-directional reservations exist. Thus, the SDP in the answer 2030 further updates the reservation state to succeeded in both directions. This meets the precondition, and so it alerts and the call proceeds as in FIG. 10.

This approach may provide one or more of the following advantages. The behavior is more clearly and fully specified for each message, which increases robustness and consistency of behavior of all network nodes. For example, it is clearer in which cases media streams can be added or deleted, or whether codecs can be changed. The approach provides for smoother integration with early media. The approach may provide a clear in-protocol semantic for indicating that, when a call is initially established, resources have already been reserved (for example, link resources in the case of access-only reservations). The approach may provide a mechanism for recovering from failures of media in the middle of a call, without terminating the call. The approach may provide a mechanism for adding streams mid-call, including the need to acquire further resource reservations.

II.F. The Heterogeneous Error Response Forking Problem (HERFP)

The Heterogeneous Error Response Forking Problem (HERFP) relates to the rules for response processing at a forking proxy. A proxy never forwards more than one error response back to the UAC. This is needed to prevent response implosion, but more importantly, to support services at proxies. A forking proxy only returns an error response upstream if all forked requests generate an error response. However, a 200 OK is always forwarded upstream immediately.

The problem is that if a request forks, and one UAS generates an error because the INVITE is not acceptable for some reason (no credentials, bad credentials, bad body type, unsupported extension, etc.), that response is held at the forking proxy until the other forks respond. Of course, another branch may find the request acceptable, and therefore never generate an error response. The effect is to cancel out the benefits of forking.

FIG. 12 shows the simplest form of the problem. In this flow, the UAC sends an INVITE to caller proxy 1012, which forks to UAS 1 1004 (INVITE 2114) and UAS2 1006 (INVITE 2116). UAS1 1004 might be a cell phone, and UAS2 1006 a business phone. UAS1 1004 rejects with a 401 Unauthorized 2118, and so never rings. However, UAS2 1006 does not require credentials (or the request already had them), and therefore it rings. However, the user is not at their business phone, although they are available at the cell phone. After ringing for 20 seconds, caller 1002 gives up, and therefore sends CANCEL 2126. This stops UAS2 1006 from ringing, and results in the proxy 1012 forwarding the now-old 401 Unauthorized 2130 to UAC 1002. UAC 1002 is not likely to retry, since the user just hung up. Thus, no call is established when it should have been.

FIG. 13 shows another HERFP case, sequential forking for a call forwarding service. UAC 1002 calls a user, and proxy 101$^2$ first forks the call to UAS1 1004. The user is not there, so the phone rings for 5 seconds, and is then cancelled 2210 by the proxy, which forks a second INVITE 2216 to UAS2 1006. UAS2 1006 challenges, resulting in a 401 Unauthorized 2218 being returned to UAC 1002. UAC 1002 tries again, which causes re-invocation of the same call forwarding service that has already failed. UAS 1 2004 rings once more for another five seconds, and then finally the call is connected to UAS2 1006. If the first UAS doesn't challenge but the others do, and there are N phones tried before completion, the first phone will ring N times. A user standing by UAS 1 1004 but electing to not answer will probably view it as a prank or malicious call.

Information should be propagated back to the UAC immediately, so that when the UAC resubmits its INVITE, the resubmission does not affect services somehow, e.g., should not re-invoke them as above.

FIG. 14 considers the scenario of FIG. 12. For brevity, PRACK requests are not shown. As before, caller 1002 sends INVITE 1012, and the proxy forks it 2314, 2316. As INVITE 2312 is forked, proxy 1012 inserts a header in the forked INVITE's 2314, 2316 that indicates services are being offered based on dialog state, and so the UAS 1004, 1006 should send 155 provisional responses instead of final responses. UAS 1 1004 challenges for credentials, but this time, it sends a 155 response 2318 that contains the challenge in the WWW-Authenticate header. Proxy 1012 passes 155 response 2320 upstream to UAC 1002. The UAC formulates the response to the challenge, and places it in an Authorization header in UPDATE 2322. UPDATE 2322 goes directly to the UAS (the proxy did not record-route). Since the credentials are valid, UAS 1 1004 proceeds with the session and rings the phone. UAS 1 1004 therefore generates a 180 Ringing response 2326 to the initial INVITE, which is passed 2328 to UAC 1002. UAS2 1006 does not challenge, and generates an immediate 180 Ringing 2330, which is passed to UAC 1002 as well. In this example, the user is at UAS 1 1004, the call is answered there, resulting in a 200 OK 2334. Proxy -1012 cancels 2338 the branch towards UAS2 1006, and the call completes successfully.

FIG. 15 considers the example of FIG. 13. The initial flow proceeds as in FIG. 13. UAS 1 1004 is rung, and there is no answer, resulting in a cancellation and an attempt to ring UAS2 1006. UAS2 1006 wishes to challenge. However, this time, UAS2 1006 issues a 155 2430 that otherwise looks like a 401 Unauthorized, which contains a WWW-Authenticate header with the challenge. This response 2430 is passed to proxy 1012 and forwarded to UAC 1002 (once again, PRACK requests are not shown). UAC 1002 generates credentials for the challenge, and sends an UPDATE 2434 with the response to the challenge. INVITE 2434 is sent directly to UAS2 1006, since proxy 1012 did not record-route. The credentials are accepted, causing the phone to ring. The user is there and picks up, generating 200 OK 2438, which is passed 2440 to UAC 1002, which sends an ACK 2442 to complete the call. Once again, a successful call setup is completed.

III. Media Interface Objects (MIO's) and Media Filter Objects (MFO's)

The SIP protocol may be extended to include two new message elements, Media Interface Objects (MIO's) and Media Filter Objects (MFO's). MIO's and MFO's allow proxy nodes 1012, 1014 (and, potentially, other intermediary nodes between caller 1002 and callee 1004) to participate in the negotiation of session policy during call setup, and may, in some cases, provide a more convenient structure for the negotiation between caller 1002 and callee 1004 as well. In a common typical use, MIO's may be generated by UAC 1002 during the SIP call setup phase, and sent to a UAS 1004, 1006. MIO's request certain policies, or indicate a menu of acceptable policies. The MIO's may be sent, for example, as headers on an INVITE request, or may be instantiated in the body of an INVITE request. In a typical use, when an MIO passes through proxy 1012, 1014 on the way to UAS 1004, and the proxy wishes to modify the SDP, the proxy attaches one or more MFO's to the message bearing the MIO, or may send independent messages with the MFO's. These MFO's indicate policy modifications requested by the proxy. When the MIO and MFO's arrive at UAS 1004, UAS 1004 applies the MFO's to the MIO, and sends an appropriate response to UAC 1002. A similar use may occur in the reverse direction: UAS 1004 may insert an MIO into a response, the proxies may attach MFO's, and UAC 1002 may then apply the MFO's to the MIO in the response.

In more general cases, MIO's and MFO's may be generated by other network nodes and sent to either UAC 1002 or UAS.

Use of MIO's and MFO's may provide networks with capabilities that are not otherwise available within a network protocol. For example, MIO's and MFO's may allow proxies to designate intermediary nodes through which the media session is to be routed, or to establish other policy parameters. These policies may be established within the protocol, without subverting the protocol.

Referring again to FIG. 1, in a typical communications network, caller 1002 (typically a phone, gateway, software on a PC, or other call-initiating client or device) wishes to initiate some kind of session with callee 1004. Caller 1002 does so by sending signaling messages through network intermediaries 1012, 1014, called "proxies" in SIP networks. Proxies 1012, 1014 are responsible for call routing, screening, and other signaling features. In the example of FIG. 1, there is a proxy server 1012 on the caller's side, and a proxy server 1014 on the callee's side. In the general case, there can be zero or more proxies in a path from a given caller to a given callee 1004, depending on the needs of the network, caller 1002 and callee 1004. Proxy 1014 is ultimately responsible for delivering the call to callee 1004.

Once the signaling through proxies 1012, 1014 is complete, media for the session (audio, video, and so on) may be sent between caller 1002 and callee 1604 directly over the IP network, without traversing proxies 1012, 1014. In such cases, the media instead traverses routers or other IP elements capable of media path processing. The term "middlebox" refers to a node through which the media are transmitted, excluding the endpoint nodes from which and to which the media are transmitted. Middleboxes may include routers, firewalls, and NAT's. (A "NAT" is a Network Address Translator, a node somewhat analogous to a router, that rewrites addresses in packets. A NAT is typically used as the switch that connects multiple nodes to the network. For outbound packets, the NAT rewrites the packet addresses so that the multiple nodes appear to have a single IP address. For inbound packets, the NAT demultiplexes the packet stream addressed to that single IP address, and forwards the packets to the appropriate one of the multiple nodes.) Frequently, the set of middleboxes for the media session is different than the set of intermediate nodes that were used during the SIP session.

In many current protocols, including SIP, proxies are forbidden from manipulating messages or enforcing media policy in any way that requires the manipulation of message bodies.

Referring to FIG. 16, MIO and MFO message elements are exchanged between nodes, enabling policies to be established and executed. In this model, caller 1002 (UA 1) sends an INVITE request 2512. INVITE 2512 contains a set of Media Interface Objects (MIO) 2514. Each MIO is a description of a media aspects of the session being set up by caller 1002. For example, there might be an MIO for each of the IP addresses and ports for each media stream, and an MIO for the set of codecs in each stream. Caller 1002 only inserts MIO's for those aspect of the session it wishes to permit the network to modify. For example, if caller 1002 only wants the network to modify codecs in the media streams, it only inserts MIO's 2514 representing the codecs.

Since the MIO's 2514 are meant for manipulation by proxies, and since they are provided to enable a SIP feature (proxy insertion of session policy), the MIO's may be carried as SIP headers of INVITE or UPDATE requests.

In some cases, MIO's 2514 may be carried in the bodies of INVITE or UPDATE requests, with the protocol modified to allow a proxy to read the bodies of only these two message types. In these cases, the proxy may treat the INVITE and UPDATE bodies as "read only," and use MFO messages to achieve any policy modifications, without tampering with the INVITE or UPDATE bodies.

In other cases, caller 1002 may insert a SIP Supported header onto another message, typically an INVITE or UPDATE message. A "Supported header" is a header type defined in SIP, that indicates extensions that are supported by the UA that put the header on the message. The Supported header generated by caller 1002 may indicate the repertoire of session policy types that caller 1002 is allowing other elements to specify. In these cases, proxies or callee 1004 may respond with MFO's to apply additional policies to the session policies offered by caller 1002.

In other cases, MIO's and MFO's may be attached to other message types as headers or in the message body. Most commonly, MIO's and MFO's will be carried on or in messages that have an impact on sessions.

As the request 2512, 2514 traverses proxies, the proxies insert Media Filter Objects (MFO) 2516. The MFO's 2516 represent "diffs" that the proxy wants to apply to each MIO 2514. MFO's 2516 inserted into requests request session policy for media streams that flow upstream, in the direction of callee 1004 to caller 1002. For example, if an MIO 2514 contains an IP address and port for receiving an audio stream, a proxy can insert an MFO 2516 that changes that address and port to that of a media intermediary. The proxy preferably doesn't modify the MIO 2514, and, in most cases, the proxy would have no need to do so. However, the framework allows for proxies to modify MIO's if needed. In some cases, MIO's are protected by end-to-end security measures. By specifying diffs relative to the MIO rather than directly modifying the MIO, MFO's 2516 enable an explicit consent and knowledge model. Caller 1002 UA can know exactly which policies were requested against the session.

If a proxy inserts an MFO 2516, it can also insert a Require header into the. INVITE or UPDATE request 2512. (A "Require header" is a header type defined in SIP, that asserts that certain extensions (for example, a list of policy types) are required by the UA or proxy that put the header on the message.) The Require header causes the request to fail if UAS 1004 does not understand the session policy requested by the MFO 2516. In some cases, some session policies may require a Require header. In some cases, policies may be optional, in which case the Require header would not be needed. If a request bearing a Require header should fail, the proxy retries the request, preferably using mechanisms that are backwards compatible with older endpoints (such as modification of the SDP).

Like an MIO 2514, the MFO 2516 will normally be represented in a SIP header, but could appear in the body or other parts of the message. Each proxy can insert its own MFO's. In some cases, the MFO's are stored on a given message using a stack discipline - each proxy "pushes" a new MFO on top of the set of existing MFO's, much like Record-Route headers are pushed into a request. In FIG. 16, note the example where proxy 1012 pushes MFO2 onto the existing message "200+ MIO2." Each MFO also can contain the identity of the domain that requested the policy. The MFO may also contain a digital signature of the domain that inserted the MFO. Such a signature may allow the UA to verify the identities of the domains that have requested session policy, and to verify the integrity of those policies.

In some cases, an MFO may specify loose routing mechanisms that should be used to deliver the media to media intermediary. Just as the Route headers allow the UA to specify a set of hops for signaling, such tunneling protocols, such as IP-in-IP, or IP loose source routing, may allow those approaches to be applied to media delivery. This may have the benefit of relieving the network from maintenance of any state.

In some cases, an MFO may request to the recipient UA to remove a given policy and/or to add a given policy—the MFO might be framed in a command form. In these cases, the UA's might be programmed to accept the MFO command form. In other cases, the form of an MFO might by purely syntactic, either stating a desired SDP, or parroting back the entire SDP with commands to remove some characters and insert some characters. In these cases, the UA may parse the MFO, determine the meaning of the differences between the SDP that it originally requested and the SDP embodied in the MFO, and then analyze whether the MFO's SDP is well-formed, and the commands necessary to request implementation of that SDP.

When the request 2512, 2514, 2516 reaches UAS 1004, UAS 1004 examines the MIO's 2514 and MFO's 2516 in the request. It will know exactly what UAC 1002 indicated, and know exactly which policies have been requested by intermediate domains. If those policies are unacceptable, it can generate an error response with an indication of which policies were not acceptable. Proxies receiving this error response may attempt to retry with a different policy, or just pass the error response upstream. When the error response arrives at UAC 1002, with a full list of the set of requested policies, UAC 1002 may determine what happened to its request, and why it failed.

If, however, the policies are acceptable to UAS 1004, and it accepts the call, it generates a 200 OK status code 2520, flowing right-to-left. (SIP uses standard HTTP status codes, and provides extensions, as described in IETF RFC 3261.) That 200 OK 2520 contains two things. First, it contains its own set of MIO's 2522 for its side of the session. It also can contain the set of MFO's 2516 from the request, copied into the response. In some cases, these MFO's 2516 may be purely informational, for the benefit of UAC 1002. In other cases, the MFO's 2516 are not informational, but specify policy diffs that UAC 1002 should apply to its media policy. MFO's usually supply end-to-end policy information, though in some cases they may supply information that is used in only a portion of the route. In some cases, the MIO's and MFO's may be modified by proxies if needed, and in some cases, the MIO's and MFO's may not be meant for modification by proxies. In some cases, the MIO's and MFO's may be protected by end-to-end integrity mechanisms, to ensure that UAC 1002 becomes aware of any policy requested by any proxy.

As the response 2520, 2522 travels back to UAC 1002, proxies can insert MFO's 2524 that request modification of the session in the caller-to-callee direction. Just like the MFO's 2516 in the forward direction, these are pushed into the request 2520, 2522, and are formatted and interpreted analogously to those in the request.

When UAC 1002 receives this response 2520, 2522, 2524, it can either reject or accept the policies proposed in the received MFO's 2524. UAC 1002 may accept the entire proposed set of MFO's 2524, for example, by sending an ACK that contains a copy of the MFO's from the response, or an MIO that applies all of the received MFO's. UAC 1002 may accept the MFO's in part, or counteroffer, for example by sending a proposed set of MFO's that UAS 1004 is to apply to its MIO's. UAC 1002 may reject, for example, by sending an ACK and a BYE that contains a reason code indicating that the call was terminated because of unacceptable MFO's. The BYE could also contain the list of MFO's from the 200 OK response.

Both endpoints 1002, 1004 then apply the media policies to the media streams they generate. This may involve, for example, sending media to an intermediary indicated in an MFO. Since the endpoints know about the full set of intermediaries, they have many options in the event of a failure (detected through an ICMP error, for example). The UA can try to send the media to the next intermediary on the path. Or, if the MFO specifies the intermediaries as a fully-qualified domain name (FQDN) instead of an IP address, the UA can attempt to use DNS to find an alternative, and begin routing media through that.

The same mechanism could be repeated in a re-INVITE or UPDATE, allowing for mid-session modification of policies.

IV. Detailed Protocol

The framework of Section III may be instantiated for insertion of media intermediaries. Media intermediaries are used for firewall and NAT traversal, enforcement of bandwidth usage, and so on. Other protocols could be constructed, for example, policies that restrict the set of media encoding formats allowed.

IV.A. Media-Stream Header

In some cases, an MIO may be transmitted in the form of a packet header, called a "Media-Stream header." This header may contain the type of media, the transport, IP address, and port. It may also contain an ID, which is a unique identifier for this MIO. A Media-Stream header may be inserted by UAC 1002 in an outgoing INVITE, and by UAS 1004 in a 200 OK. The following is the grammar for this header:

| | | |
|---|---|---|
| Media-Stream | = | stream-info * (COMMA stream-info) |
| stream-info | = | discrete-type * (SEMI stream-params) |
| stream-params | = | address-param / port-param / transport-param / id-param |
| address-param | = | "host" EQUAL (hostname / IPv4address / IPv6reference) |
| port-param | = | "port" EQUAL port |
| id-param | = | "id" EQUAL token |

(This is only a part of the grammar for the Media-Stream header. The definition of the grammar, and further productions in the grammar that define the terminals and non-terminals not defined here, may be found in the SIP specification, a current draft of which may be found at IETF RFC 3261. For example, "/" is the OR operator, "*" is the repeat operator, discrete-type may reduce to values such as "audio" and "video", and transport-param may reduce to values such as "udp" and "tcp".)

An example Media-Stream header:
Media-Stream: audio;id=7736ai;host=192.2.0.3; port=8876, video;id=hha9s8sd0;host=192.2.0.3; port=8878

This specifies two media streams, an audio stream and a video stream. Both streams are sent to 192.2.0.3, but the audio is sent to port 8876 and the video to port 8878. These parameters would match the values in the SDP in the body.

IV.B. Media-Middlebox Header

In some cases, an MFO may be implemented as a Media-Middlebox header, an MFO that asks that the media flow thorough a designated middlebox. A Media-Middlebox header contains, for a particular media stream (identified by the ID from the Media-Stream header), the address and port of the middlebox, the domain that has requested insertion of the middlebox, and a loose source routing protocol to reach that middlebox.

Media=Middlebox intermediary*(COMMA intermediary)

| | | |
|---|---|---|
| intermediary | = | stream-id * (SEMI intermediary-params) |
| stream-id | = | token |
| intermediary-params | = | address-param / port-param / transport-param / lroute-param / domain-param |
| lroute-param | = | "route" EQUAL route-protocols |
| route-protocols | = | "ip-in-ip" / "ip-loose" / "media-specific" |
| domain-param | = | "domain" EQUAL host |

The loose routing parameter, lroute-param, requires some further discussion. The purpose of the Media-Middlebox header is for a proxy to tell the UA to send the media for a particular stream through an IP address and port of a specified intermediary. Instead of merely sending the media there, the UA can instead specify a source route, which touches that intermediary, but also any other intermediaries and the final recipient. Thus, if there arc N hops, including the final recipient, there needs to be a way for the media stream to specify N destinations. This can be done in several ways, for example, the three options specified by the three possible values "ip-in-ip," "ip-loose," or "media-specific" for the loose routing parameter:

ip-in-ip: IP-in-IP tunneling can be used to specify N hops of media traversal. The ultimate destination is specified in the destination IP of the innermost packet. Each subsequent hop results in another encapsulation, with the destination of that hop in the destination IP address of the packet. IP-in-IP tunneling is discussed in C. Perkins, "IP encapsulation within IP," Request for Comments 2003, Internet Engineering Task Force (Oct. 1996), available at IETF RFC 2003.

ip-loose: IP provides a loose routing mechanism that allows the sender of an IP datagram to specify a set of IP addresses that are to be visited on the way before reaching the final destination.

media-specific: Media protocols can provide their own loose routing mechanism. If that is the case, the loose routing mechanism of that protocol is used.

In one example use of "media-specific", the IM Transport Protocol (IMTP) uses SIP MESSAGE requests for sending IM. SIP provides its own loose routing mechanisms with the Route header. These can be used to direct the MESSAGE through the set of intermediaries. This allows a SIP INVITE to set up a session of instant messages. Those instant messages can travel through a set of intermediaries. The MESSAGE may be routed through those intermediaries using the SIP Route headers. The Route headers in that MESSAGE may be obtained using the media policies inserted by proxies. Although the protocol example here is using a SIP header for that purpose, the media policies (i.e., the hop that the MESSAGE should go through) can be obtained from the body or from any other part of the SIP message.

IV.C. Reverse-MM-Policy

MFO's may be conveyed in a "Reverse-MM-Policy header." A Reverse-MM-Policy header is typically provided to a UAC or UAS for informational purposes. A Reverse-MM-Policy header is typically a collection of MFO's that UAS 1004 will apply to the MIO sent by UAC 1002, or that the UAC 1002 will apply to the MI sent by the UAS 1004. For example, a Reverse-MM-Policy header may convey the middleboxes used in the path of media towards the recipient. A Reverse-MM-Policy header is typically attached in a 200 OK or ACK request. Its syntax is identical to the Media-Middlebox header.

IV.D. UAC Behavior

IV.D.1. Generating the Request

A UAC that supports MIO's and MFO's may insert a Supported header into an INVITE or UPDATE request with the option tag "middlebox." This indicates support for the "middlebox" extension, and willingness to let the network specify media intermediaries.

For each media stream being set up or modified by the request, there should be a Media-Stream header, bearing one or more MIO's. The media type, address, port, and transport for the header is to be copied from the media type, connection address, and port, and transport from the session description in the request. UAC 1002 includes an id attribute for each media stream. This attribute has a value that is unique within the session description. As a result, the session identifier (from the o line in SDP) along with the stream id attribute, specify a globally unique identifier for a media stream.

IV.D.2. Processing the Response

If the response is a 200 OK, it may contain a Require header with the value of "middlebox." In this case, UAC 1002 is requested to use a media intermediary. There will be a Media-Stream header, conveying MIO's for each media stream in use for the session. UAC 1002 can verify that these match the media streams from the session description that was present in the 200 OK response. If they do not match, the response may have been tampered with, and the UA can terminate the session with BYE. If they do match, the UA checks for a Media-Middlebox header. If a Media-Middlebox header exists, it will include a stack of MFO's. UAC 1002 traverses the list of header field values (MFO's) in reverse order. For each header field value, it looks for a matching id among the values (MIO's) of the Media-Stream header field. If there is a match, the identity of the intermediary is "pushed" into a stack associated with that media stream. This stack is maintained in the memory of UAC 1002. When this process completes, UAC 1002 will have a set of intermediaries to visit for each media stream.

If this set of intermediaries is not acceptable, UAC 1002 can ACK and then BYE the call. The BYE may contain a Reason header indicating that the call was terminated because of unacceptable intermediaries. Reason headers are described in H. Schulzrinne, D. Oran, and G. Camarillo, "The reason header field for the session initiation protocol," available at IETF RFC 3326.

The 200 OK response may also contain the set of intermediaries that will be used on the media path from callee 1004 to UAC 1002. This will be present in the Reverse-MM-Policy header in the 200 OK. If this is not acceptable, UAC 1002 can ACK and then BYE the call. The BYE can contain a Reason header indicating that the call was terminated because of unacceptable intermediaries.

If the set of intermediaries is acceptable, when UAC 1002 sends media on a stream, it sends it to the top intermediary in the stack. The media is sent using the transport protocol and loose routing mechanism (if any) specified.

The ACK generated by UAC 1002 can contain a Reverse-MM-Policy header field. This header field contains the same value as the Media-Middlebox header field from the 200 OK.

IV.E. UAS Behavior

IV.E.1. Receiving the INVITE or UPDATE

As received by UAS 1004, an INVITE request may have a Require header indicating that UAS 1004 must understand the media intermediary extension in order to process the request. In that case, the request will contain both a Media-Stream header and a Media-Middlebox header.

For each value (an MIO) in the, Media-Stream header field, UAS 1004 matches the stream with its counterpart in the session description in the body. Assuming it will otherwise generate an answer to the offer in the INVITE, UAS 1004 discards any Media-Stream header field values (MIO's) corresponding to media streams disabled (by setting the port to zero) in the SDP in the answer. The resulting set of Media-Stream header field values are called the working set.

UAS 1004 then begins processing the values (MFO's) of the Media-Middlebox header in reverse order. For each value, UAS 1004 finds the matching stream in the working set (the match is based on the id attribute in the Media-Middlebox value). The Media-Middlebox value (MFO) is then pushed into a stack associated with the matching value from the working set. When the process is complete, there is a stack of intermediaries specified for each media stream accepted by UAS 1004.

If the set of middleboxes is not acceptable to UAS 1004, it can reject the response with an error response code. This response can contain Warning headers indicating the specific reasons for rejection.

If the set of middleboxes is acceptable, UAS 1004 generates an answer (in the 2xx, or a reliable 155 provisional response, as described in J. Rosenberg and H. Schulzrinne, "Reliability of provisional responses in SIP," available at IETF RFC 3262). This response contains a Reverse-MM-Policy header that mirrors the value (MFO) of the Media-Middlebox header from the request. The response also contains a Media-Stream header, containing a value for each stream used in the answer (the MIO's). The response can contain a Require header with the value "middlebox" in order to indicate that media policies were applied to the request.

When UAS 1004 sends media, it sends it to the top middlebox in the stack, using the address, port, transport, and optionally loose route specified by that policy.

IV.E.2. Receiving the ACK

An ACK request may contain a Reverse-MM-Policy header that informs UAS 1004 of the media policies used to route requests from caller 1002 to itself. If this set is not acceptable, UAS 1004 can generate a BYE to send the session.

IV.F. Proxy Behavior

IV.F.1. Receiving a Request

When a proxy receives an INVITE or UPDATE request with a Supported header with the value middlebox, it knows it can attempt to use media policies on this request. To do so, it inserts a value into the Media-Middlebox header (adding the header field if not present) at the top for each stream it wishes to apply media processing for. The streams are identified with the Media-Stream header in the request. The proxy may insert multiple media policies for the same stream. The proxy may insert a Require header into the request, with the value "middlebox", if it insists that UAS 1004 understand the extension in order to continue with the session. If the result is a 420 ("Bad Extension") response, UAC 1002 can retry the request without the media policy.

IV.F.2. Receiving a Response

When a proxy receives a response to an INVITE or UPDATE request that contained a Supported header with the value "middlebox," and the response contains a Require header with the value "middlebox," the proxy can insert values (MFO's) into the Media-Middlebox header (adding the header field if not present) at the top, for each stream it wishes to apply processing for. The streams are identified with the Media- Stream header in the response. The proxy can insert multiple media policies for the same stream.

V. Example Call Flows

The framework and the protocol are best explained through some examples. We provide three example flows here.

V.A. Example I: IP-in-IP NAT

Referring to FIG. 17, caller UA1 2602 is on the public Internet. Caller UA1 2602 wishes to call a user, UA2 2604, sip:user2@foo.com. The foo.com domain is running on a net-10 network. The network has a single multi-homed proxy server 2612, and it has a multi-homed router 2618 for media processing. The router has a public interface of 1.2.3.4.

FIG. 18 shows the flow for the call. Caller 1002 sends an INVITE 2712. This INVITE looks like, in part:

INVITE sip:user2@foo.com SIP/2.0

Supported: middlebox

Media-Stream: audio;address=9.8.7.6;port=1288;
  id=fxx9;transport=udp
Content-Type: application/sdp
Content-Length: . . .
v=0
o=alice 2890844526 2890844526 IN IP4 host.anywhere.com
c=IN IP4 9.8.7.6
t=0 0
m=audio 1288 RTP/AVP 0

INVITE 2712 is passed to the foo.com proxy 2612. Proxy 2612 does not require the specific usage of an intermediary for media from callee 1004 (who is within foo.com) to caller 1002. Therefore, it merely proxies the request after a registration lookup. This request 2716 arrives at UAS 1004. UAS 1004 decides to accept the session. It generates a 200 OK 2718 with its own Media-Stream headers, which looks like, in part:

SIP/2.0 200 OK
Require: middlebox
Media-Stream: audio;address=10.0.1.1;port=7788;
  id=jhh7;transport=udp
Content-Type: application/sdp
Content-Length: . . .
v=0
o=bob 2890887s 2890686626 IN IP4 10.0.1.1
s=
c=IN IP4 10.0.1.1
t=0 0
m=audio 7788 RTP/AVP 0

OK 2718 is received by proxy 2612. Proxy 2612 knows it needs to have media destined for this UA pass through router 2616. To do that, proxy 2612 requests caller 1002 to use IP-in-IP encapsulation. So, it adds a Media- Middlebox header to the response, to create message 2720:

SIP/2.0 200 OK
Require: middlebox
Media-Middlebox: jhh7;address=1.2.3.4;route="ip-in-ip"
Media-Stream: audio;address=10.0.1.1;port=7788;
  id=jhh7;transport=udp
Content-Type: application/sdp
Content-Length: . . .
v=0
o=bob 2890887s 2890686626 IN I4 10.0.1.1
s=
c=IN IP4 10.0.1.1
t=0 0
m=audio 7788 RTP/AVP 0

Message 2720 arrives at UAC 1002. UAC 1002 generates an ACK 2722, which mirrors the Media-Middlebox header from the 200 OK:

ACK sip:ua2@10.0.1.1 SIP/2.0
Route: sip:1.2.3.3
Reverse-MM-Policy: jhh7;address=1.2.3.4;route="ip-in-ip"

UAC 1002 then sends media. To do so, it generates an IP datagram with the destination IP address 1.2.3.4. The protocol is IP in IP. The inner datagram is a UDP packet, with destination 10.0.1.1, port 7788. This packet 2726 is sent to 1.2.3.4, which arrives at router 2616. Router 2616 decapsulates the packet, and forwards the innermost packet. This packet is destined for 10.0.1.1, which is reachable from its internal interface. It sends decapsulated packet 2728 there, and the media arrives at UA2 2604. In the reverse direction, callee 1004 sends packets to 9.8.7.6 2730. These pass through router 2616, which NAT's the source address, and forwards 2732 them on to caller 1002.

Note that there was no MIDCOM protocol needed. There is no state stored in either the proxy 2612 or in router 2616. This is because the "state", in this case, the binding between a public address and private one, has been pushed to the end systems, and sent back into the network through the IP-in-IP encapsulation. This mechanism can be considered a cross between RSIP (which also uses tunneling) and midcom (which has proxies modifying messages). RSIP is described in M. Borella, J. Lo, D. Grabelsky, and G. Montenegro, "Realm specific IP: framework," Request for Comments 3102, Internet Engineering Task Force (Oct. 2001), IETF RFC 3102.

The drawbacks of the use of IP-in-IP tunneling here are clear. First, there is an additional 12 byte overhead per packet for the additional IP header. The second drawback is the slow-path processing which is likely to be seen at the router for decapsulation and forwarding. This may limit the volume of traffic that can be supported on any router. Interestingly, this problem is easily resolved through load balancing. Instead of including an IP address in the Media-Middlebox header, the proxy can include a domain name that contains multiple SRV records, one for each router being used. The clients can perform a randomized selection amongst the records, distributing the load across routers with very little additional overhead. Failure is provided in the same way. If the IP-in-IP packet generates an ICMP error, caller 1002 knows that the intermediary failed. It can then use a different DNS record for an alternate. This results in highly robust and scalable operation.

Another drawback of this approach, however, is that it doesn't provide any media policy enforcement, per se. That is, it is useful strictly for NAT. No firewall or policy enforcement is provided. An attacker can send packets into the private network, without call setup. They merely send an IP-in-IP packet, with the outermost address equal to the router interface, and the innermost destination address that of the host that is to be communicated with. Firewall mechanisms may be combined with the stateless mechanisms of this approach by using different encapsulation protocols. Such protocols may provide encapsulation, and also allow for the presentation of authorization tokens, handed out by the proxy to the UA's, that permit specific packet processing in the router. This would effectively be a generalization of the call authorization tokens described in W. Marshall et al., "SIP extensions for media authorization," Internet Draft, Internet Engineering Task Force (Feb. 2002), available at IETF draft draft-ietf-sip-call-auth.

Routing of media operates in a similar fashion to the SIP routing of the ACK. The ACK has a destination of sip: ua2@10.0.1.1, carried in the request-URI, but an intermediate hop (carried in the Route header) of sip: 1.2.3.3. The proxy can remain stateless because the ultimate destination is encapsulated within the ACK message it receives from caller 1002. The same is true for the media.

VI. Further Applications

MIO's and MFO's may be useful in the following applications.

VI.A. End-to-End Encryption

The use of MIO's and MFO's may allow improved use of encryption. For example, conventional SIP uses S/MIME to support end-to-end security features. Authentication, message integrity, and encryption may be provided, to prevent numerous attacks, including theft of calls, eavesdropping attacks, and so on. If end-to-end authentication is used, any manipulation of the body will cause the message integrity check to fail. If end-to-end encryption is used, the proxy won't even be able to look at the SDP to modify it. Because the MIO's and MFO's operate without requiring a proxy's access to a message body, in some cases, end-to-end authentication and encryption may be used where they would otherwise be unusable.

VI.B. Processing of Require headers

A UA may require that special processing apply to the SDP body. This is accomplished by including a Require header in the SIP message. By using the MIO and MFO protocol, proxies may be relieved of any burden to understand or process Require headers. If the proxy processes the SDP without understanding a policy extension contained in the SDP, the proxy may improperly modify the SDP, resulting in a call failure.

VI.C. Consent

Ultimately, end users need to be in control of the media they send. MIO's and MFO's may improve a user's control of calls through a SIP network, and increase the likelihood that data will be delivered to the recipient in the expected form, without unexpected modifications imposed by proxies after the media has left caller 1002.

VI.D. Future Proofing

One of the design goals of the SIP architecture is to confine the need to understand sessions, session descriptions, bodies, and so on, to only endpoints. This facilitates the use of proxy networks to provide communications services for future session types, such as games and messaging. MIO's and MFO's reduce the need for proxies to understand session types and session descriptions, which may increase the flexibility of a SIP network to expand the features provided for particular session types. New session description protocol, such as SDPng, may be readily introduced, by upgrading only the endpoints that are to use SDPng sessions. (A draft proposal for SDPng is described at D. Kutscher, J. Ott, and C. Bormann, "Session description and capability negotiation," at IETF draft draft-ietf-mmusic-sdpng.)

VI.E. Robustness

MIO's and MFO's may increase robustness of a network, but reducing the number of failure modes in a network. MIO's and MFO's may reduce the amount of state that a proxy must maintain if the proxy were to manipulate the SDP. By reducing state, MIO's and MFO's may improve the ability of a network to reroute packets and calls; thus proxy failures may be less likely to result in the termination of a call. Similarly, MIO's and MFO's may reduce the reliance of a call on a particular media middlebox somewhere on the media path that would otherwise be required to enforce media policy.

VI.F. Scalability

One of the reasons SIP scales so well is that proxies need not be aware of the details of the sessions being established through them. If a proxy needs to examine and/or manipulate session descriptions, this could require many additional processing steps. The proxy may need to traverse a multi-part body to find the SDP, in the case of SIP-T and possibly re-serialize the session description. All of this requires additional processing that worsens the performance of the proxies.

Analogous problems are pointed out with the Open Pluggable Exchange Services (OPES), as described in S. Floyd and L. Daigle, "IAB architectural and policy considerations for open pluggable edge services," IETF RFC 3238. Both have to do with the involvement of intermediaries in manipulation of end-to-end content. Here, the content is not in the body itself, but is a session described by the body.

For example, one scenario is in the traversal of a firewall or NAT. The midcom group within the IETF has defined a framework for control of firewalls and NATs (generically, middleboxes). See, for example, P. Srisuresh, J. Kuthan, J. Rosenberg, A. Molitor, and A. Rayhan, "Middlebox communication architecture and framework," archived at IETF RFC 3303. In this model, a midcom agent, typically a proxy server, interacts with the middlebox to open and close media pinholes, obtain NAT bindings, and so on. The use of MIO's and MFO's allows a proxy to serve its role as a midcom agent, examining and possibly modify the session description, and allowing the proxy to force the media to route through an intermediary. The use of MIO's and MFO's allows the proxy to do so in a way that is fully within the SIP protocol.

In another application, SIP is used in a wireless network. The network provider has limited resources for media traffic. During periods of high activity, the provider may wish to restrict codec usage on the network to lower rate codecs. MIO's and MFO's may be used by proxies to modify the SDP, removing the higher rate codecs.

In a third application, SIP is used in a network that has gateways, in which the gateways support a single codec type (say, G.729). When communicating with a partner network that uses gateways with a different codec (say, G.723), the network modifies the SDP to route the session through a converter that changes the G.729 to G.723.

In all three of these applications, use of MIO's and MFO's may allow proxies to examine and/or manipulate the content of the SDP, without modifying the body of a SIP packet. Especially in cases where the MIO's and MFO's are instantiated in packet headers, MIO's and MFO's may allow end-to-end encryption to be applied. MIO's and MFO's may reduce the number of failure modes, may reduce fate sharing, and may reduce performance bottlenecks.

Although the discussion above is specific to SIP, the concepts are general to signaling in any network where there is a separation between the signaling elements and the media elements. It should be understood that the claims are not limited to SIP implementations, except where specific elements of the SIP protocol are expressly recited in the claims.

A key to the SIP extensions to the IP message code numbers may be found at www.cisco.com/univercd/cc/td/doc/product/voice/sipproxy/admingd/ver2_0/stnappa.htm and in IETF RFC 3261, both incorporated herein by reference.

Unless otherwise specified, IETF "RFC" documents referred to in the specification are permanently archived at www.ietf.org/rfc or //kaizi.viagenie.qc.ca/ietf/rfc. RFC's 1889, 2003, 2327, 2543, 3102, 3238, 3261, 3262, 3264, 3303, 3311, 3312 and 3326, 3407 are incorporated herein by reference. Printed copies of these documents may be found-in the application file of this patent, or in the files of the two parent provisional applications.

Unless otherwise specified, IETF draft documents may be found at www.ietf.org/internet-drafts or at www.cs.columbia.edu/sip/drafts. All drafts posted to either of these directories at or before the filing date of this application are incorporated by reference, as well as any RFC's maturing out of these drafts as of the filing date of this application. This includes at least the following IETF drafts:

| Draft name | All versions up to and including |
| --- | --- |
| draft-andreasen-mmusic-sdp-simcap | 5 |
| draft-ietf-avt-srtp | 5 |
| draft-ietf-midcom-framework | 7 |
| draft-ietf-mmusic-sdpng | 5 |
| draft-ietf-sip-100rel | 6 |
| draft-ietf-sip-call-auth | 6 |
| draft-ietf-sip-manyfolks-resource | 7 |
| draft-ietf-sip-reason | 1 |

-continued

| Draft name | All versions up to and including |
|---|---|
| draft-ietf-sip-rfc2543bis | 9 |
| draft-ietf-sip-update | 2 |
| draft-rosenberg-mmusic-sdp-offer-answer | 2 |
| draft-rosenberg-sip-early-media | 2 |
| draft-schulzrinne-sip-reason | 2 |
| draft-sen-sip-earlymedia | 1 |
| draft-burger-sipping-em-rqt | 1 |

The usual naming convention for IETF draft documents provides that the last two digits of the file name are a version number. Thus, even if the versions referred to here have been removed from the server, updated versions of the documents referenced herein may generally be obtained from the "internet-drafts" directory, and finding the same root name with the latest version number. In a few cases, the document may have been abandoned when the proposal has become mature enough to be promoted to a formal RFC, or be renamed.

Unless otherwise specified, IETF SIP mail archive documents may be found at www1.ietf.org/mail-archive/working-groups/sip/current. Messages 00664 are incorporated herein by reference.

A portion of the disclosure of this patent document contains material that is protected by copyright. The copyright owner has no objection to the facsimile reproduction of the patent document or the patent disclosure as it appears in the Patent and Trademark Office file or records, but otherwise reserves all copyright rights whatsoever.

For the convenience of the reader, the above description has focused on a representative sample of all possible embodiments, a sample that teaches the principles of the invention and conveys the best mode contemplated for carrying it out. The description has not attempted to exhaustively enumerate all possible variations. Other undescribed variations or modifications may be possible. For example, where multiple alternative embodiments are described, in many cases it will be possible to combine elements of different embodiments, or to combine elements of the embodiments described here with other modifications or variations that are not expressly described. Many of those undescribed variations, modifications and variations are within the literal scope of the following claims, and others are equivalent.

The invention claimed is:

1. A method among nodes of a computer network, comprising the steps of:
    sending a session-invitation message from a client node of the network to a server node of the network, the session-invitation message being a message in a network messaging first protocol that defines (a) a session-invitation primitive for invoking a session-invitation method in a server node, the session-invitation method establishing a channel at a level of the first protocol between the client and the server according to parameters of the session-invitation message that specify characteristics of a session in a second protocol, (b) a success response primitive by which the server indicates successful grant of the session-invitation primitive, and (c) a failure response primitive by which the server indicates failure of the session-invitation primitive;
    the session-invitation message using the session-invitation primitive and bearing a message header, the message header specifying one or more policies of a session of the second protocol;
    at an intermediary node of the network, adding new information to the session-invitation message requesting modification of the session policies, and transmitting the session-invitation message to the server node, wherein the intermediary node is a proxy;
    receiving a provisional response from the server, the server holding in abeyance a success or failure response to the session-invitation message, without establishing a channel at the level of the first protocol if no such channel is previously established, and without disrupting a channel at the level of the first protocol if such channel has been previously established;
    invoking a second method, the second method reconfiguring the characteristics of the session of the second protocol;
    amending the session-invitation message according to the provisional response;
    sending the amended session-invitation message to the server;
    receiving one of a success response or a failure response, the content of the response being based at least in part on the amended session-invitation message; and
    in response to receipt of a success response by the client, establishing a connection between the server and the client.

2. A method among nodes of a computer network, comprising the steps of:
    sending a request message from a client node of the network to a server node of the network, the request message to establish a session and being a message in a network messaging protocol that defines (a) a request primitive for making a request from the client to the server, the request message using the request primitive, (b) a success response primitive by which the server indicates successful grant of the request, and (c) a failure response primitive by which the server indicates failure of the request primitive;
    receiving a provisional response from the server, the server holding in abeyance a success or failure response to the request, without establishing a channel at the level of the protocol if no such channel is previously established and without disrupting a channel at the level of the protocol if such channel has been previously established;
    amending the request message according to the provisional response;
    sending the amended request to the server;
    receiving one of a success response or a failure response, content of the response based at least in part on the amended request.

3. The method of claim 2, further comprising the steps of: using messages of the protocol to establish connections between the server and the client, the protocol defining a sequence of messages:
    a first message that invokes a first method in the server, the first method establishing a channel at the level of the protocol between the client and the server according to parameters of the first message that specify characteristics of a second protocol; and
    a second message between client and server that invokes a second method in a recipient of the second message, the second method reconfiguring the second protocol characteristics of the recipient.

4. The method of claim 2, wherein the message exchange occurs as part of a process of establishing a channel between the server and the client.

5. The method of claim 2, wherein the message exchange occurs in a session initiation protocol for establishing a media session over a IP (internet protocol) channel.

6. The method of claim 2:
wherein the first message containing information describing a policy for a network communication session;
and further comprising the step of at an intermediary node of the network, adding new information to the message requesting modification of the policy.

7. The method of claim 2:
wherein a first message is a session-invitation message to the server node of the network, the session-invitation message bearing a message header, the message header bearing one or more policies of a session;
and further comprising the step of at an intermediary node of the network, adding new information to the session-invitation message requesting modification of the policies, and transmitting the session-invitation message to the server node.

8. The method of claim 2, wherein the response is based at least in part on information provided in the request.

9. The method of claim 2, wherein the provisional response indicates that additional information must be provided by the client for proper processing of the request.

10. The method of claim 2, wherein the provisional response requests further information about the client, and the amended request provides the requested information.

11. The method of claim 10, wherein the provisional response requests additional security credentials.

12. The method of claim 10, wherein the provisional response requests a different security parameter.

13. The method of claim 10, wherein the provisional response requests a different payload type.

14. The method of claim 10, wherein the provisional response requests a smaller payload.

15. The method of claim 10, wherein the provisional response requests a set of media encoding mechanisms implemented at the client.

16. The method of claim 2, wherein the provisional response requests further information about network nodes between the server and client, and the amended request provides the requested information.

17. The method of claim 16, wherein a second protocol characteristic includes a set of network address and network port information where media is to be sent and received.

18. The method of claim 16, wherein the provisional response requests a different communications medium type.

19. The method of claim 2, wherein the provisional response requests a different set of required extensions to the protocol.

20. The method of claim 2, further comprising the step of: at an intermediary node of the network, forking the request message to two distinct server nodes of the network, at least one of the two server nodes then performing the sending of a provisional response from the server to the client.

21. The method of claim 2, wherein the provisional response:
maintains a transaction between the client and the server; and
provides additional information to the client.

22. A method, comprising the steps of: using a first communications protocol to establish connections between two or more nodes of a network, the first protocol defining a sequence of messages:
a first message that invokes a first method in a recipient of the first message, the first method establishing a channel at a level of the first protocol between a sender of the message and the recipient according to parameters of the first message that specify characteristics of a second protocol; and
a second message that invokes a second method in a recipient of the second message, the second method reconfiguring the characteristics of the second protocol of the recipient, without establishing a channel at the level of the first protocol if no such channel is previously established, and without disrupting a channel at the level of the first protocol if such channel has been previously established, wherein the second message is a provisional response that holds in abeyance a success or failure response to the first message, the first message is amended according to the provisional response, and a success response or a failure response is received, the content based at least in part on the amended first message.

23. The method of claim 22, further comprising the steps of:
the first message contains information describes a policy for a session of the second protocol; and
at an intermediary node of the network, adding new information to the message requesting modification of the policies, and forwarding the message to a recipient of the first message.

24. The method of claim 22, wherein the characteristic of the second protocol includes a specification of whether a security profile is to be used.

25. The method of claim 22, wherein the characteristic of the second protocol includes session parameters.

26. The method of claim 22, wherein the characteristic of the second protocol includes a set of media encoding mechanisms implemented at the client.

27. The method of claim 26, wherein the set includes mutually-exclusive mechanisms, from among which a session in the second protocol must use at most one.

28. The method of claim 22, wherein the characteristic of the second protocol includes a set of network address and network port information where media is to be sent and received.

29. A method performed among nodes of a computer network, comprising the steps of:
from a client node, sending a session-invitation message, the session-invitation message bearing a message header, the message header bearing one or more policies of a session, wherein the session-invitation message is a message in a network messaging protocol that defines (a) a session request primitive for inviting a server node into a session with a client node, (b) a success response primitive by which the server indicates successful grant of the request, and (c) a failure response primitive by which the server indicates failure of the request primitive;
at an intermediary node of the network, adding new information to the session-invitation message requesting modification of the policies, and transmitting the session-invitation message to a server node of the network, wherein the intermediary node is a proxy;
and further comprising the steps of:
transmitting the session request with the policy-modification information from the intermediary node to a server node of the network specified in the session-invitation message as sent by the client node:
in response to receipt by the server of the request, sending a provisional response from the server to the client, and holding in abeyance a success or failure response to the request, without establishing a channel at the level of the protocol if no such channel is Previously established and without disrupting a channel at the level of the protocol if such channel has been previously established:

amending the request according to the provisional response:

in response to receipt by the client of the provisional response, sending an amended request from the client to the server;

in response to receipt by the server of the amended request, sending a response to the client, being a success response or a failure response, the content of the response being based at least in part on the amended request.

30. The method of claim 29, further comprising the step of:

transmitting the message, including the added session policy information, to a server node of the network.

31. The method of claim 30, wherein:

the message including the added session policy information describes two or more distinct policies of a session description.

32. The method of claim 29, wherein the client node is a caller initiating the communication session.

33. The method of claim 29, further comprising the step of: exchanging messages between at least two nodes from the group consisting of the intermediary node, the client node, and the server node, the two nodes each contributing information to establish a loose route for subsequent session data.

34. The method of claim 29, wherein the client node is a callee for receiving the communication session.

35. The method of claim 29, further comprising the step of: exchanging messages between the client node and intermediary node, the client and intermediary nodes each contributing information to establish a loose route for subsequent session data.

36. The method of claim 29, further comprising the step of: exchanging messages between the client node and intermediary node, the client and intermediary nodes each contributing information to establish set of media encoding formats for the session.

* * * * *